(12) United States Patent
Moriwaki et al.

(10) Patent No.: US 7,298,752 B2
(45) Date of Patent: Nov. 20, 2007

(54) PACKET COMMUNICATION DEVICE

(75) Inventors: Norihiko Moriwaki, Hachioji (JP); Koji Wakayama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1119 days.

(21) Appl. No.: 10/339,340

(22) Filed: Jan. 10, 2003

(65) Prior Publication Data

US 2004/0071142 A1 Apr. 15, 2004

(30) Foreign Application Priority Data

Oct. 11, 2002 (JP) ............................ 2002-298227

(51) Int. Cl.
*H04L 12/28* (2006.01)
*G06F 15/173* (2006.01)

(52) U.S. Cl. ...................... 370/401; 370/390; 370/218; 370/469; 370/359; 709/226; 709/246

(58) Field of Classification Search ........ 370/229–235, 370/359, 390, 392, 401, 216–218, 225, 412, 370/415, 419, 420, 469, 474; 709/240, 226, 709/246

See application file for complete search history.

(56) References Cited

U.S. PATENT DOCUMENTS

| | | | | |
|---|---|---|---|---|
| 5,734,649 | A * | 3/1998 | Carvey et al. | 370/355 |
| 5,864,535 | A * | 1/1999 | Basilico | 370/231 |
| 5,905,725 | A | 5/1999 | Sindhu et al. | |
| 5,918,074 | A * | 6/1999 | Wright et al. | 710/52 |
| 5,974,467 | A * | 10/1999 | Haddock et al. | 709/240 |
| 6,160,811 | A * | 12/2000 | Partridge et al. | 370/401 |
| 6,243,360 | B1 * | 6/2001 | Basilico | 370/231 |
| 6,424,659 | B2 * | 7/2002 | Viswanadham et al. | 370/469 |
| 6,553,000 | B1 * | 4/2003 | Ganesh et al. | 370/235 |

(Continued)

FOREIGN PATENT DOCUMENTS

CN 2506044 Y 8/2001

(Continued)

OTHER PUBLICATIONS

Itaru Mimura, Takeki Yazaki and Norihiko Moriwaki, "Terabit Node for Next-Generation IP Networks", pp. 155-158.

(Continued)

*Primary Examiner*—Edan D. Orgad
*Assistant Examiner*—Venkatesh Haliyur
(74) *Attorney, Agent, or Firm*—Reed Smith LLP; Stanley P. Fisher, Esq.; Juan Carlos A. Marquez, Esq.

(57) ABSTRACT

A reliable packet communication device capable of flexibly adding new functions. A packet communication device is composed of multiple interface elements (IFEs), switching elements (SWE) connecting these IFEs, and a routing manager element (RME) and may also if necessary comprise special functional packet processors (xFPs) capable of different special functions. The interface element and special functional packet processor are connected by a logical bus. For the purpose of connecting the interface elements and special functional packet processors through the switching element when the logical bus has a failure, the logical bus data format is made identical to the data format for passing data through the switch element and a selection circuit is installed in the interface element for selectively sending and receiving data to/from either the logical bus or the switching element.

17 Claims, 22 Drawing Sheets

U.S. PATENT DOCUMENTS

| | | | |
|---|---|---|---|
| 6,671,277 B1 * | 12/2003 | Sugai et al. | 370/395.21 |
| 6,775,706 B1 | 8/2004 | Fukumoto et al. | |
| 6,870,844 B2 * | 3/2005 | Tuck et al. | 370/390 |
| 7,065,090 B2 * | 6/2006 | Rashid et al. | 370/395.31 |
| 2002/0097725 A1 | 7/2002 | Dighe et al. | |
| 2002/0174244 A1 * | 11/2002 | Beckwith et al. | 709/231 |
| 2003/0069973 A1 * | 4/2003 | Ganesan et al. | 709/226 |
| 2003/0126233 A1 * | 7/2003 | Bryers et al. | 709/219 |

FOREIGN PATENT DOCUMENTS

| | | |
|---|---|---|
| JP | 11-298486 | 4/1998 |
| JP | 2002-064542 | 8/2000 |

OTHER PUBLICATIONS

Itaru Mimura, Takeki Yazaki and Norihiko Moriwaki, "Terabit Node for Next-Generation IP Networks", pp. 155-158, Hitachi Review, vol. 49, No. 4, Dec. 2000.

* cited by examiner

Prior Art FIG.2
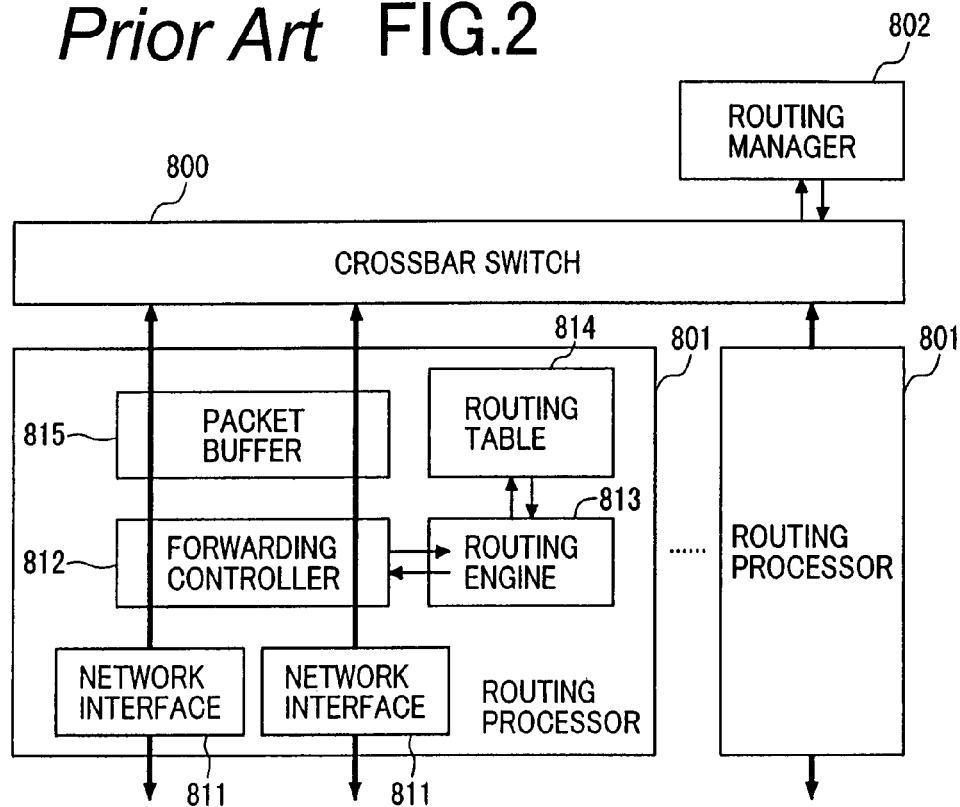
Prior Art FIG.3
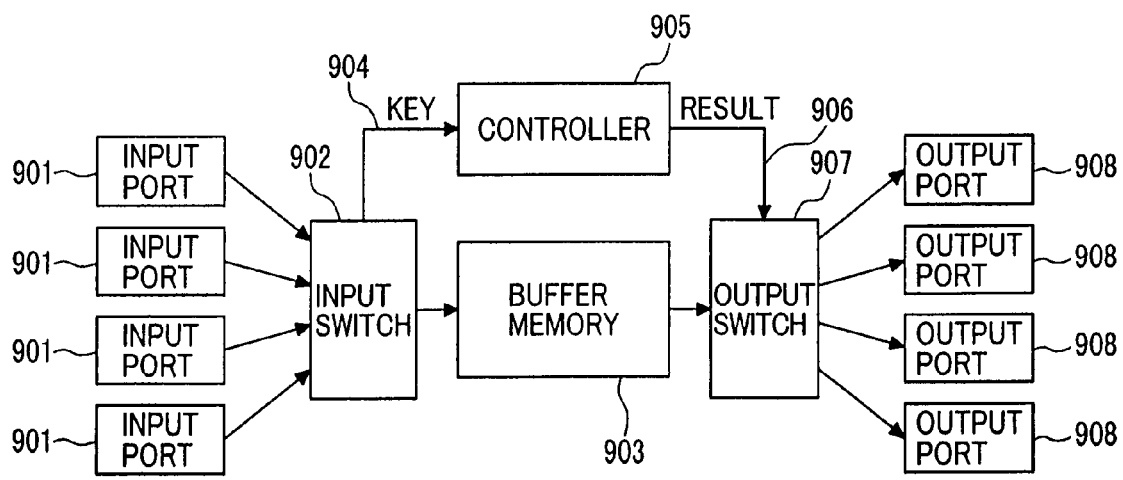

PACKET COMMUNICATION DEVICE

BACKGROUND OF THE INVENTION

1. Field of the Invention

The present invention relates to a packet communication device for performing routing and forwarding of layer 2 frames such as the Ethernet (registered commercial trademark), layer 3 packets for example, IP (Internet Protocol) and even upper layer data packets.

2. Description of Related Art

[Non-patent document 1] Hitachi Review Vol. 49 (2000), No. 4

[Non-patent document 2] U.S. Pat. No. 6,905,725

[Patent document 1] JP-A No. 64542/2002

Data traffic including traffic on the Internet has rapidly increased in recent years. A shift can also be observed towards an Internet infrastructure with high quality and highly reliable service, which has been performed on leased lines. To cope with this shift, packet communication devices as well as transmission paths must offer high speed operation, be highly reliable and have a large capacity. Packet communication devices must also be flexible in terms of functions in order to be able to respond swiftly with new routing protocols and new services or to be capable of easily adding these functions when needed. The router is one example of a packet communications device for layer 3 processing. There are also many special function routing devices in particular whose hardware performs high speed routing and forwarding. A structure for a hardware router is disclosed for example in non-patent document 1 and non-patent document 2. FIG. 2 is a block diagram of the hardware router disclosed in the non-patent document. Multiple routing processors 801 containing a network interface 811 are mutually connected by a crossbar switch 800. Each routing processor 801 is composed of a forwarding controller 812, a routing controller 813, a routing table 814 and a packet buffer 815. The packet header of the IP packets input through the network interface 811 are extracted from the packet by the forwarding controller 812, and a route search performed by the routing controller 813. Destination information, filtering information for security purposes, and QoS (Quality of Service) information are entered in the routing table 814. The IP packet is input to the packet buffer 815 after search processing is completed. Then, the packet is sent to the desired output port through the crossbar switch 800. The routing manager 802 contains a routing protocol and exchanges routing information with neighbor routers. This routing manager 802 also establishes the forwarding path for each IP packet. This established forwarding path is reflected in the routing table 814 within the routing processor 801. In this way, this router has a structure with distributed routing processors and packet buffer sections.

An example of another hardware router structure is disclosed in U.S. Pat. No. 6,905,725 (Non-patent document 2).

FIG. 3 is a block diagram showing the hardware router disclosed in non-patent document 2. The IP packet input through an input port 901 is stored in a buffer memory 903 through an input switch 902. In the input switch 902, key information 904, which is extracted from the IP packet such as the destination IP address, is input to a controller 905. After the destination search is performed for each packet in the controller 905, that result (Result 906) is sent to an output switch 907. Based on this result 906, the output switch 907 then loads the IP packets accumulated in the buffer memory 903 into the corresponding output port 908. The routing processor (controller 905) and the packet buffer in this way constitute a centralized structure.

In the technology disclosed in JP-A No. 64542/2002 (patent document 1), the labeled packets and IP packets are separated based on header information attached to them on an input line interface. The IP header was then sent to a forwarding engine after separation. However, no consideration was given to scalability in this method.

The switch disclosed in non-technical document 1 has high scalability performance since the routing functions and forwarding functions are distributed. In the structure shown in non-patent document 1 however, the forward controller is tightly coupled to the routing controller and installed in the same routing processor section. From the viewpoint of hardware implementation, the hardware have to be completely redesigned to introduce new routing protocols and new services. In other words, this structure is not suitable for adding new functions.

The switch architecture disclosed in non-patent document 2 has centralized control of routing and forwarding functions. Therefore, buffer memory usage is highly efficient and the device can be compactly fabricated. However, it is difficult to apply this architecture for a large scale router because of processing bottlenecks of centralized routing functions and forwarding functions. In terms of flexibility for adding new functions, the routing hardware would require complete redesigning for new protocols, even though the routing functions and forwarding functions have been distributed. Besides, this structure is not able to perform services with upper layer packets.

SUMMARY OF THE INVENTION

In view of the above problems with the related art, the present invention has the object of providing a packet communication device with functional flexibility. More specifically, the invention has the object of providing a packet communication device, which can be configured as a base model having a simple layer 2 forwarding function. Further, the invention has the object of providing a packet communication device with upgradability and expandability. In other words, functions such as upper layer processing and special function services can be added to the base model. Still further, the invention has the object of providing a packet communication device with performance scalability. In other words, it is possible to increase performance of the same function dynamically as required.

The packet communication device is composed of a basic switch element, a basic packet forwarding section, special functional packet processor and a routing manager. The basic packet forwarding section has a basic layer 2 forwarding function. The special functional packet processor performs processing for layer 3 or higher layer protocol. The special functional packet processor can be added to the base packet communication device when required. In other words, the simplest structure does not contain the special functional packet processor. The routing information processed within the routing manager is used by the special functional packet processor when necessary. The basic packet forwarding section decides whether or not the input packet requests layer 2 basic forwarding or a special function. When the packet requets a special function, the packet is forwarded to the applicable special functional packet processor.

More specifically, a forwarding control function sends only the header to the special functional packet processor when only header processing is required. Further, when it is required to assemble multiple packets, which comprise a consecutive flow for higher layer processing, the forwarding control function sends the entire packets to the special functional packet processor.

A preferred aspect of the present invention has multiple line interfaces for accepting the input packets, a routing manager for deciding the forwarding path of the input packets, a crossbar switch, a first connecting path to connect the crossbar switch and the multiple line interfaces, a special functional processor, a second connecting path to connect the special functional processor and the multiple line interfaces, and a special function judgment block for deciding whether or not the input packet requires special function processing. In this aspect of the present invention at least a portion of the input packets are forwarded to the special functional processor based on the decision by the special function judgment block. Unlike the data bus (first connecting path), the second connecting path does not use the crossbar switch for connecting to the special functional processor. Therefore, the first connecting path is independent from the main signal data path. These connecting paths can be a bus configuration or point-to-point connections.

The second connecting path can be used as a redundant path for the first connecting path. The header format or the whole packet format sent to the special functional packet processor from the basic packet forwarding section is identical to the data path format to the basic switch element from the basic packet forwarding section. This aspect enables path rerouting function. This means that it is possible to send packets or headers to the special functional packet processor through the switch element when path failure occurs on the path from the basic packet forwarding section to the special functional packet processor. This aspect further comprises a function for adding a special functional packet processor of the same type when the special functional packet processor does not have sufficient capacity, enabling load balancing of the special function. To distribute the traffic load among installed functional packet processors from the basic packet forwarding section, this aspect further has any of the following functions of: (1) a HASH functional distributor based on the destination IP address; (2) a cyclical distributor and order preserving function, or (3) a load balancer function and order preserving function based on load observation of each of the special functional packet processors.

Another aspect of the packet communication device is composed of a basic switch element, a basic packet forwarding section, a special functional switch element and a routing manager. The special functional switch element has switching function with layer 3 or higher layer processing. This special functional switch element is added to the base packet communication device when necessary. A structure without the special functional switch element constitutes a base system. The routing information from the routing manager may be transferred to the special functional switch element when required. The basic packet forwarding section decides whether or not the input packet requires layer 2 basic forwarding or a special function. The basic packet forwarding section has also a forwarding address judgment means which relates each packet requesting special function to the corresponding special functional switch element. The basic switch element has a basic crossbar switch without a buffering means. On the other hand, the special functional switch element has an input buffer means, which is used to queue the packets from the basic packet forwarding section. The packets are read sequentially from the queue and special functions are applied to them. The special functional switch element also has an output buffer, which is used to switch processed packets to the desired basic packet forwarding section in a way that avoids contention. It is also possible to add the same special functional switch element when required. The traffic from the basic packet forwarding section is load balanced among the special functional switch elements. To enable load balancing, the basic packet forwarding section further has any of the following functions of: (1) a distributor with a HASH function based on the destination IP address; (2) a cyclical distributor and order preserving function, or (3) a load balancing function and order preserving function based on load monitoring of the special functional packet processor.

Another aspect of the present invention is composed of multiple line interfaces, a crossbar switch connecting to the multiple line interfaces, and multiple slots for installing the special functional units connected to the plurality of line interfaces. Each of the multiple line interfaces has a layer 2 processing function and a special function judgment function for deciding whether or not the packet that was input requires special processing. Packets without special function processing are forwarded directly to the crossbar switch. Packets requiring special processing are, first, sent to a corresponding special functional unit, next, subjected to upper layer processing, then, sent back to the original line interface and, finally, forwarded to the crossbar switch. In these aspects of the invention, additional special functional units can be added and deleted as needed. Therefore, scalability can be provided for each function. To increase and decrease the special functional units, the invention preferably has a load balancing function.

BRIEF DESCRIPTION OF THE DRAWINGS

FIG. 2 is a block diagram showing a structure of a packet communication device of the related art;

FIG. 3 is a block diagram showing a structure of a packet communication device of the related art;

DETAILED DESCRIPTION OF THE PREFERRED EMBODIMENTS

The embodiments of the packet communication device of the present invention are described next.

Figure 1:
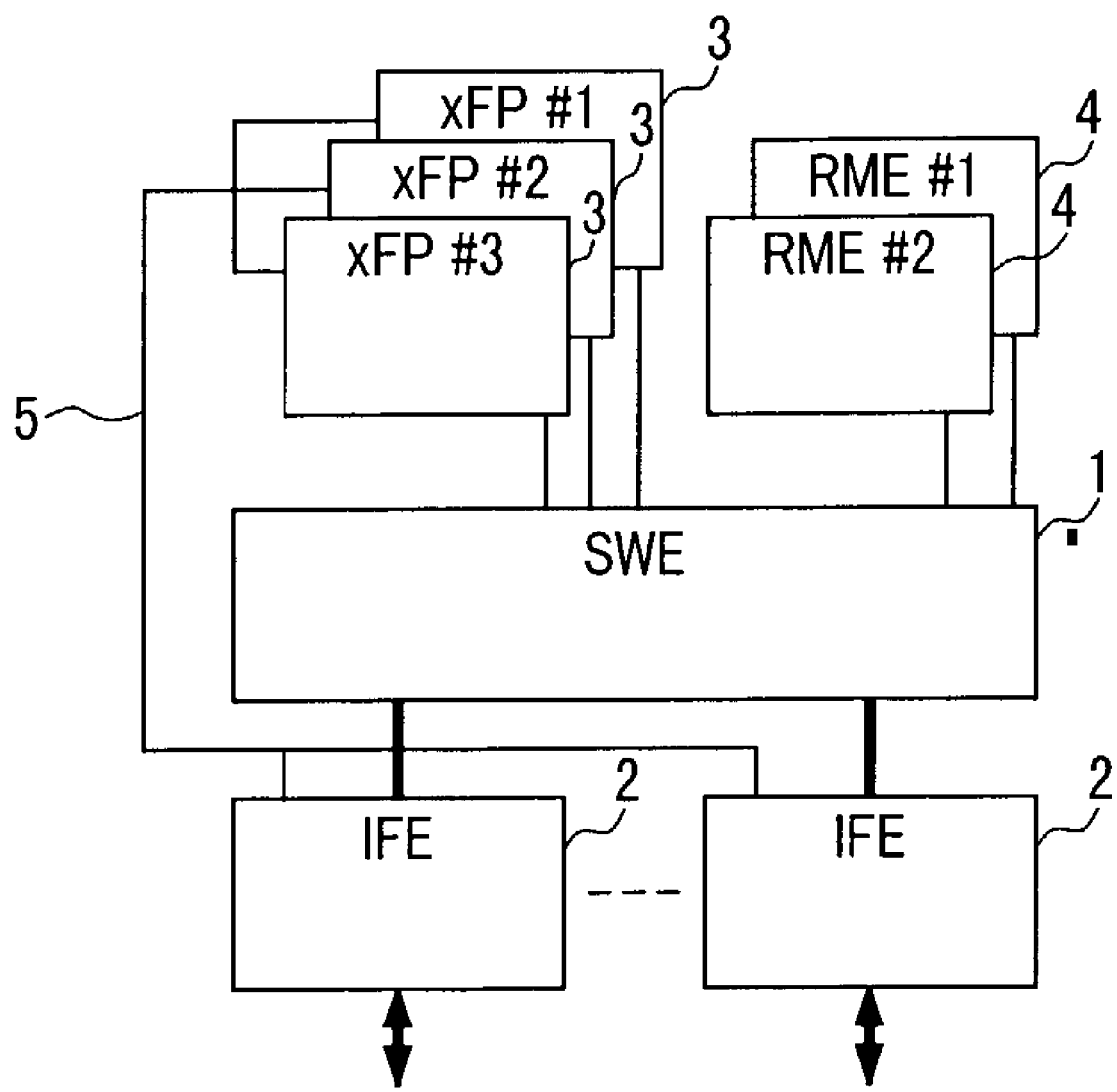
FIG. 1 is a block diagram showing the function block of the packet communication device of the present invention.

A block diagram of the overall structure of the packet communication device of the present invention is shown in FIG. 1. This packet communication device is composed of multiple interface elements (IFE) 2, special functional packet processors (xFP) 3 for performing special processing, a switch element (SWE) 1 connecting to the multiple IFE2, and routing manager elements (RME) 4. In these RME4, routing information is exchanged among the other connected devices. Routing protocols such as RIP, OSPF are used to exchange routing information. Here, IFE2 and xFP are connected through the logical bus 5, enabling any-to-any connection.

Figure 4:
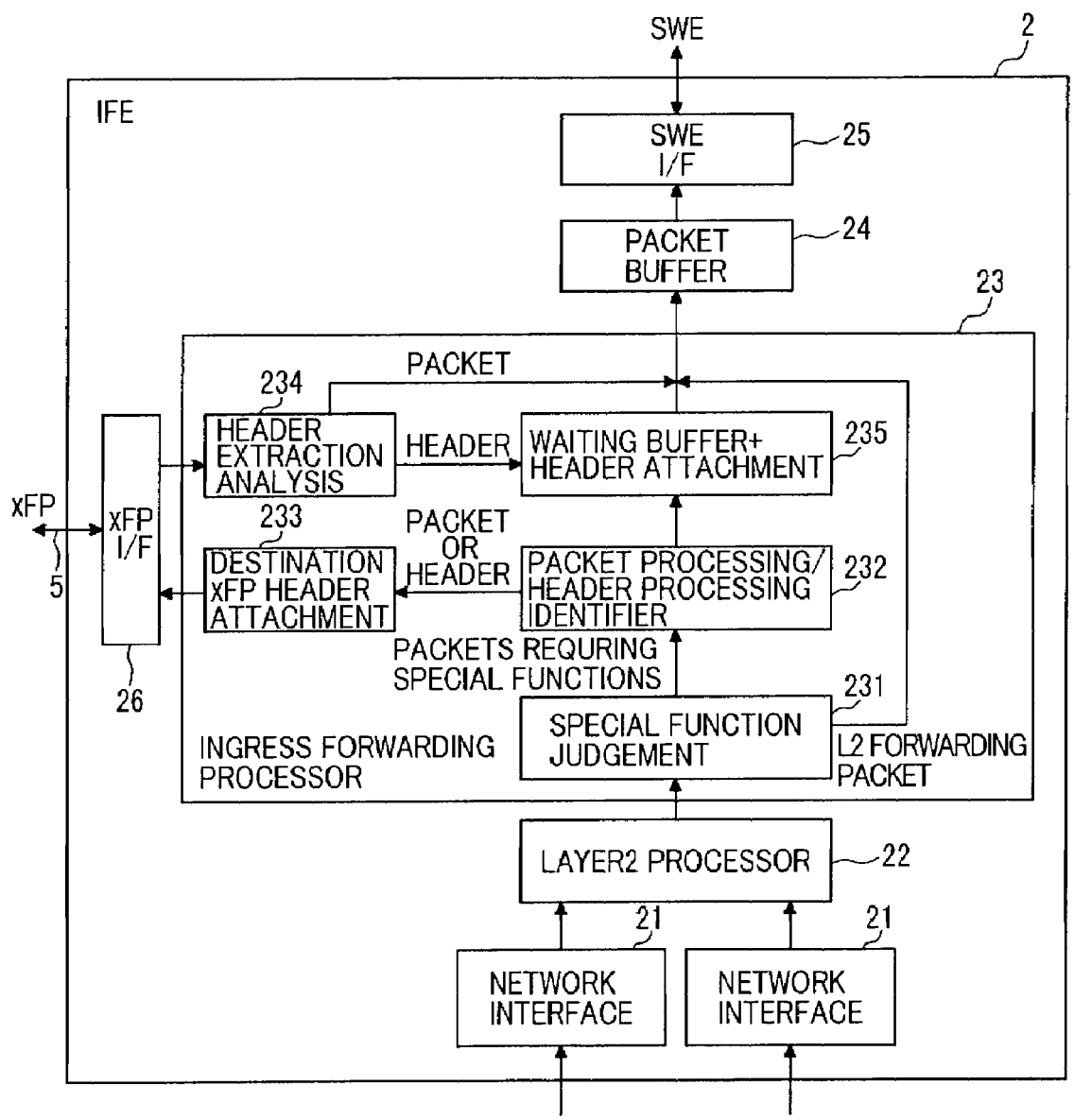
FIG. 4 is a block diagram showing the structure of the interface module of the packet communication device of the present invention.

The IFE2 function block is first explained using FIG. 4. The input side of the IFE2 is composed of a network interface 21, a layer 2 processor 22, an ingress forwarding processor 23, a packet buffer 24, an SWE I/F 25 and an xFPI/F26. First, packet frames input to the device undergo physical layer-processing by the network interface 21. For example, the case of the Ethernet, MAC (Media Access Control) layer processing is performed. The destination output port of the destination MAC address is identified by the layer 2 processor 22 using the destination address within the frame, source address, VID (VLAN ID), FDG (Forwarding Data Base).

The ingress forwarding processor 23 then judges whether or not to perform special function processing to the input frame (called a packet in layer 3). The ingress forwarding processor 23 is composed of a special functional judgment block 231, a packet processor/header processor 232, a destination (xFP) header attacher 233, a header extraction/analyzer 234 and a waiting buffer 235. The header of the input packet is first identified by the special functional judgment block 231 and a decision is made as to whether or not special functional processing is required. Packets (frame) without requiring special functional processing are sent to the packet buffer 24 by bypassing the subsequent processing. Packets requiring special functional processing are then judged by the packet processor/header processor 232 regarding whether the special functional processing is required for only the packet header or for the entire packet. When processing is required only for the packet header, then the header portion is sent to the destination (xFP) header attacher 233. The data of that packet is held in the waiting buffer 235 until the header processing ends. When the entire packed must be processed, the whole packet is sent to the destination (xFP) header attacher 233. In the destination (xFP) header attacher 233, the destination xFP3 header is attached to the packet header or entire packet to send them for the corresponding desired special functional processing. Next, the packet header or entire packet is output through xFPI/F26. After processed in desired XFP3, the packet header or entire packet is sent to the header extraction/analyzer 234. The data input to the header extraction/analyzer 234 is identified as to whether it is the packet header or the entire packet based on the header attached by xFP3. If identified as the entire packet then it is sent to the packet buffer 24. If identified as the packet header, it is sent to the waiting buffer+header attacher 235. After being coupled with the waiting packet data, it is sent to the packet buffer 24. The packets input to the packet buffer 24 are queued and output to the SWE1 through the SWEI/F25.

Figure 5:
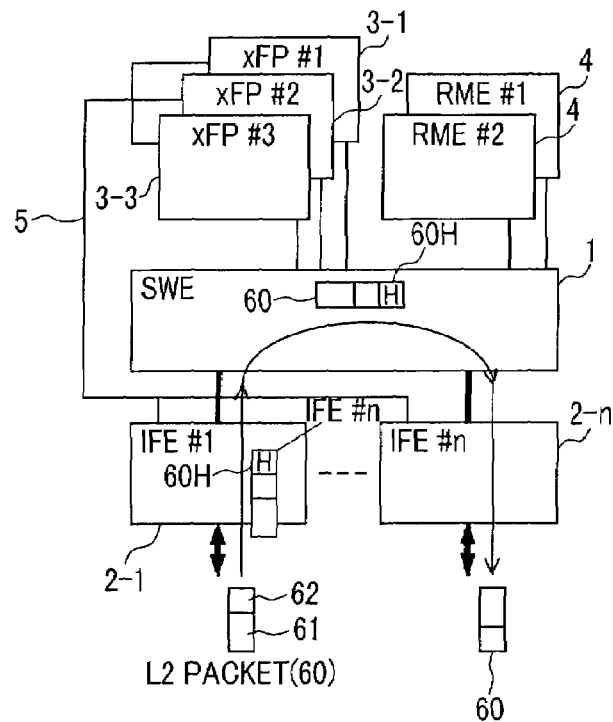
FIG. 5 is a block diagram showing the structure of the packet communication device of the present invention.

An example of layer 2 packet forwarding is described next while referring to FIG. 5. The packet 60 input to IFE 2-1 is composed of a data section 61 and a header section 62. The destination SWE1 port is obtained at the layer 2 processor 22 in the IFE 2. If the packet 60 is judged by the ingress forwarding processor 23 as no special processing is required, the packet is forwarded to the desired egress IFE (in this example, IFE2-n) according to the internal header 60H attached at the ingress IFF2.

Figure 6:
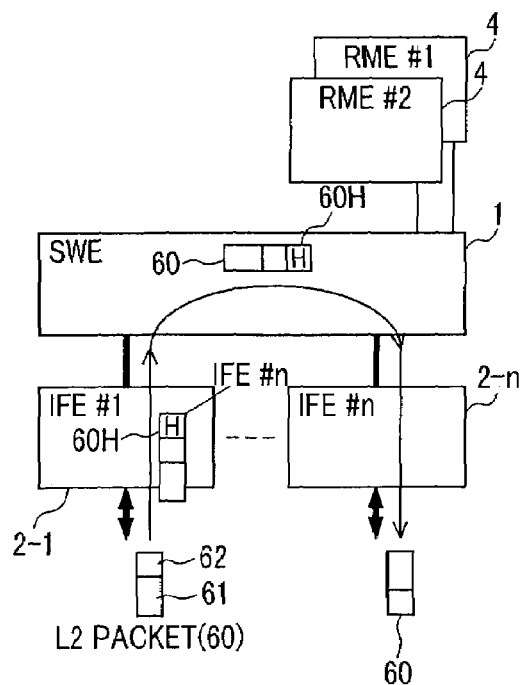
FIG. 6 is a block diagram showing the structure of the packet communication device of the present invention.

FIG. 6 is a block diagram showing another structure of the packet communication device of the present invention. When special function processing is not required for the device, only basic layer 2 function is installed. In other words, processing is performed using the base model without installing an xFP3 as shown in FIG. 6.

Figure 23:
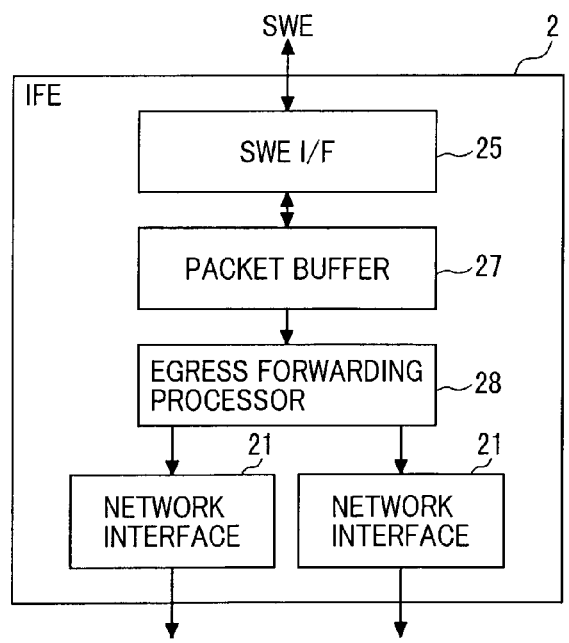
FIG. 23 is a block diagram showing another structure of the interface module of the packet communication device of the present invention.

The function block of the egress IFE2 is described while referring to FIG. 23. The function block of the egress IFE2 is composed of an SWE I/F25, a packet buffer 27, an egress forwarding processor 28, and network interfaces 21. The packet forwarded from SWE1 is input to the packet buffer 27 through the SWE I/F25. It is well known that using fixed length packets enables a simple and efficient switch architecture. Therefore, if multiple fixed-length packets (cells) are used inside the system to switch packets, the cells are reconstructed into the original variable-length packet in the packet buffer 27. Priority output control is also performed in the packet buffer 27 according to the quality class. The headers of the packets (in the case of layer 3 packets) output from the packet buffer 27 are rewritten for their next destination by the egress forwarding processor 28. More specifically, the destination MAC address is rewritten to a MAC address called a Next Hop. This Next Hop MAC address is the MAC address of the router (switch) on the next path to the destination. The packet is then output from the output line to the next address through the network interface 21.

An example for transferring the layer 3 packet is described using FIG. 7 through FIG. 10.

Figure 7:
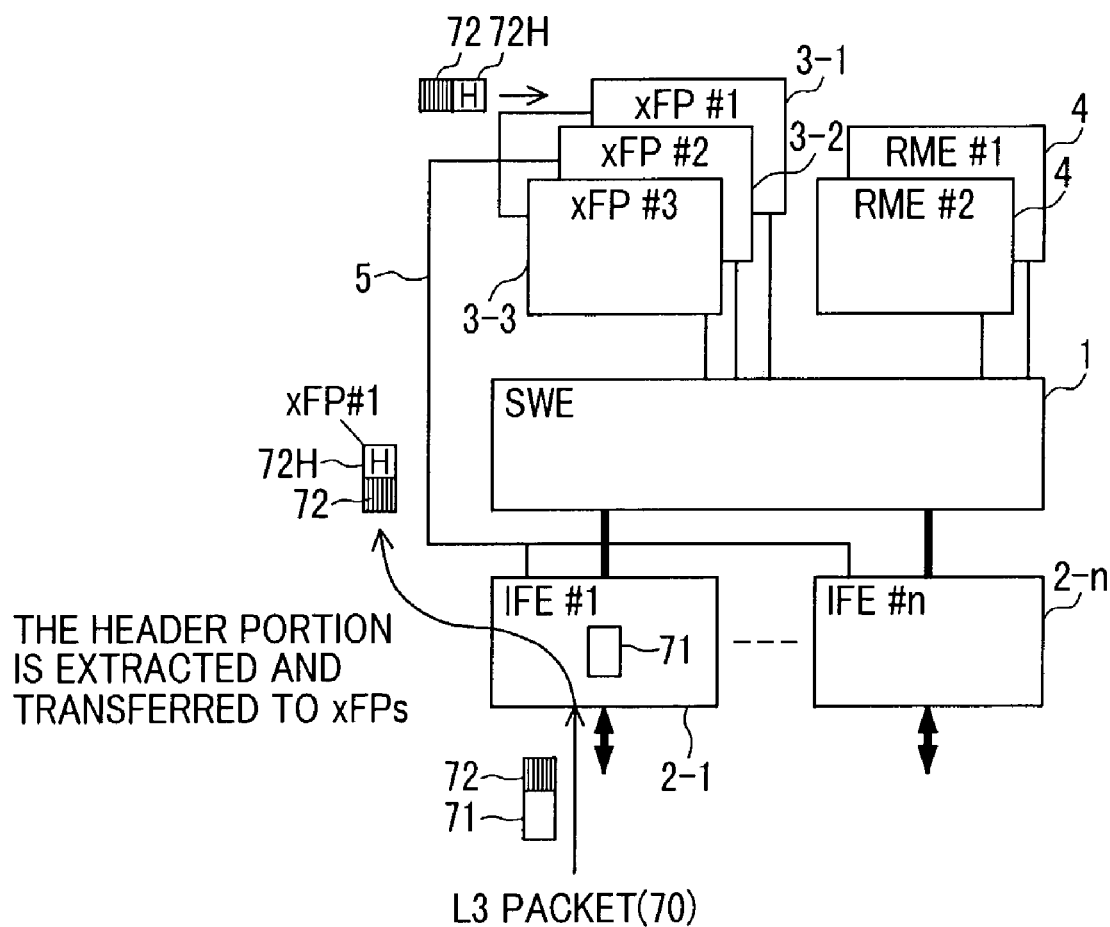
FIG. 7 is a block diagram showing the structure of the packet communication device of the present invention.
Figure 10:
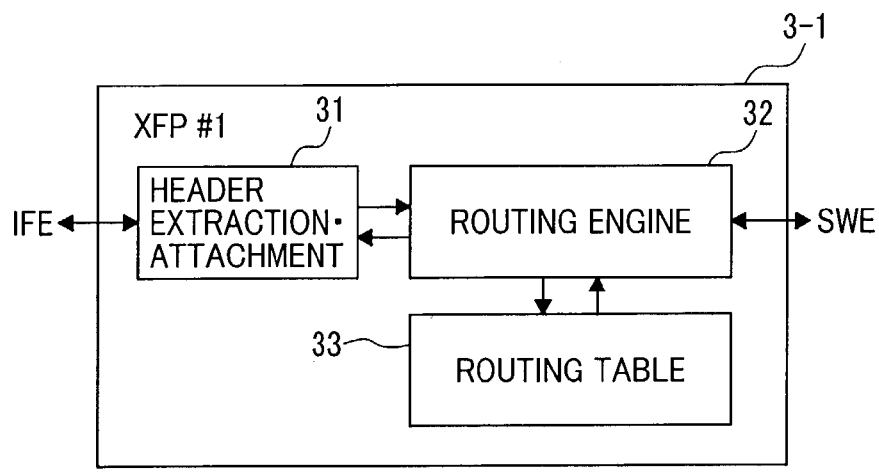
FIG. 10 is a block diagram showing the structure of the special functional packet processor (xFP) of the packet communication device of the present invention.

In FIG. 7, the packet 70 input to IFE 2-1 is composed of a data section 71 and a header section 72. In case the ingress forwarding processor 23 within the IFE2-1 detects that layer 3 processing is required, only the header portion 72 of the packet is extracted and sent to xFP3 for dedicated layer 3 processing. The data section 71 keeps waiting in the waiting buffer 235 until receiving the header from the xFP. An internal header 72H corresponding to xFP3 is attached to the header section 72 to forward the header section 72 for xFP3-1. The structure of the xFP3a for layer 3 processing is shown in FIG. 10. First, the header 72 is extracted by the header extraction/attachment 31, then, destination port searching, filtering and QoS is performed in the routing processor based on the header 72.

Figure 8:
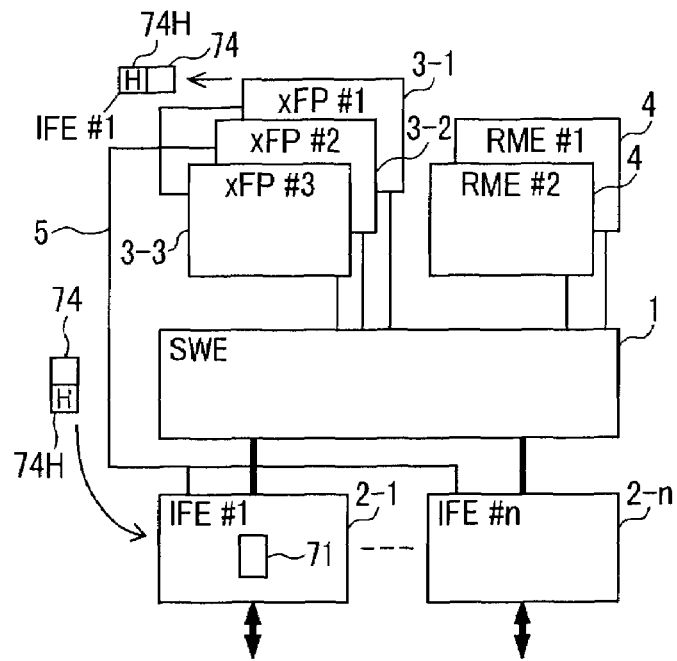
FIG. 8 is a block diagram showing the structure of the packet communication device of the present invention.
Figure 9:
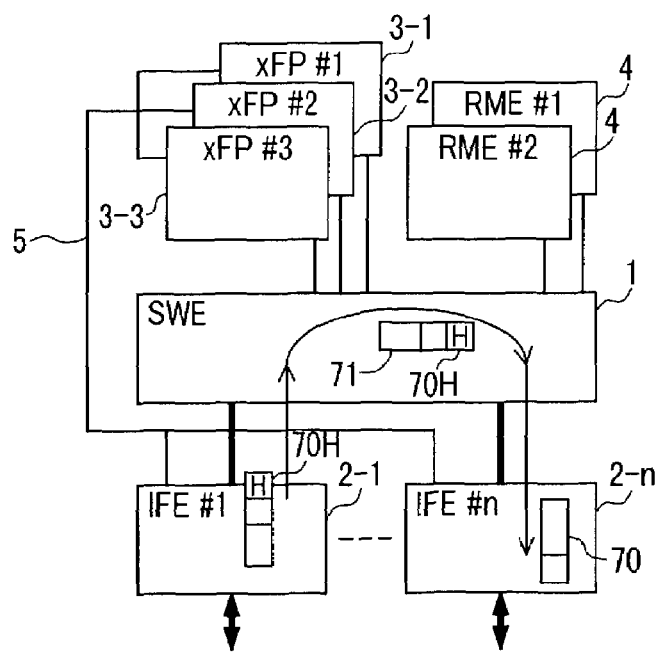
FIG. 9 is a block diagram showing the structure of the packet communication device of the present invention.

FIG. 8 and FIG. 9 are block diagrams showing a structure of the packet communication device of the present invention.

The processing information for each IP address is stored in the routing table 33. The header 74, which contains information obtained from the routing processor 32, is processed by the header extraction processor 31 so that an internal header 74H is attached for the purpose of sending back the header 74 to the source IFE2 (in this example, IFE2-1). This flow is shown in FIG. 8. As shown in FIG. 9, the header 74 that arrived at the source IFE2 (in this example, IFE2-1) is combined with the data section 71 in the waiting buffer 235. Then, the device internal header 70H corresponding to the desired output IFE is attached to the data section to forward the packet to the output IFE2 (in this example, IFE2-n) through SWE1. The xFP, which is dedicated for layer 3 processing, can be added incrementally as needed to deploy new IP protocol versions or to enhance protocol, etc.

An example of upper layer packet forwarding is shown next using FIG. 11 through FIG. 14.

Figure 11:
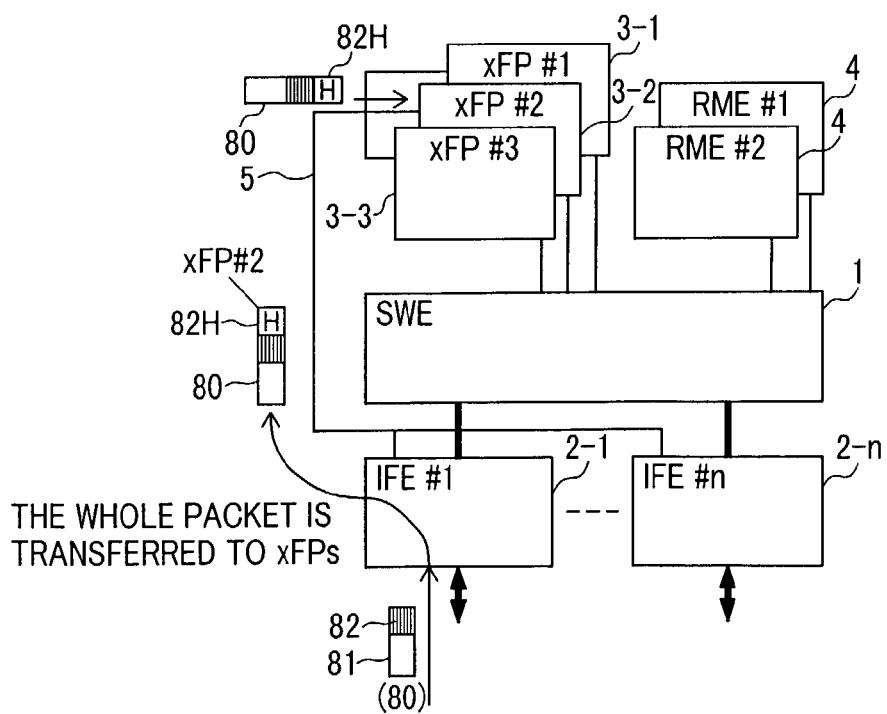
FIG. 11 is a block diagram showing the structure of the packet communication device of the present invention.
Figure 14:
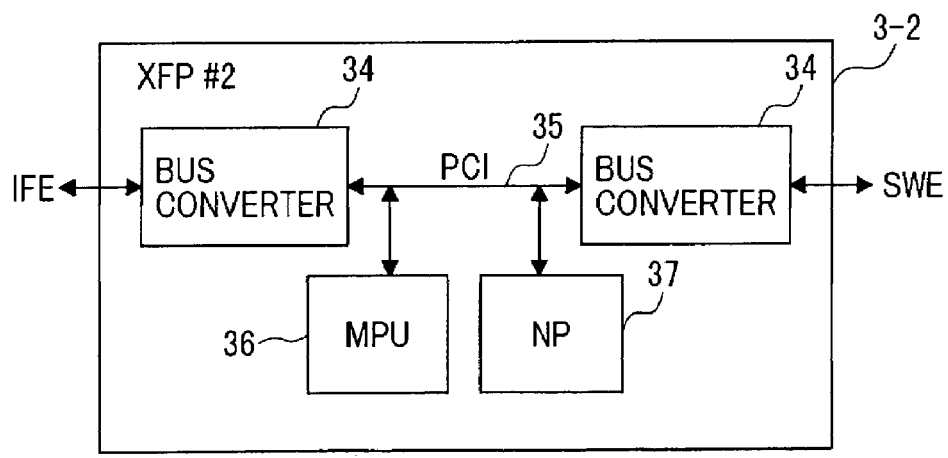
FIG. 14 is a block diagram showing the structure of another special functional packet processor (xFP) of the packet communication device of the present invention.

In FIG. 11, the packet 80 input to the IFE2-1 is composed of a data section 81 and a header section 82. When the ingress forwarding processor 23 judges that upper layer processing is required, the entire packet 80 is sent to the xFP3 (in this example, xFP3-2) which performs upper layer dedicated processing. An internal header 82H corresponding to the xFP3-2 is attached to the packet 80 to transfer packet 80 for xFP3-2. The structure of the xFP3-2 is shown in FIG. 14. The packet 80 input to the xFP3-2 is forwarded to the network processor (NP) 37 or the microprocessor unit (MPU) 36 through the bus (for example the PCI bus). Then, packets are assembled for application layer processing. In this example, bus converter 34 terminates the PCI bus.

Figure 12:
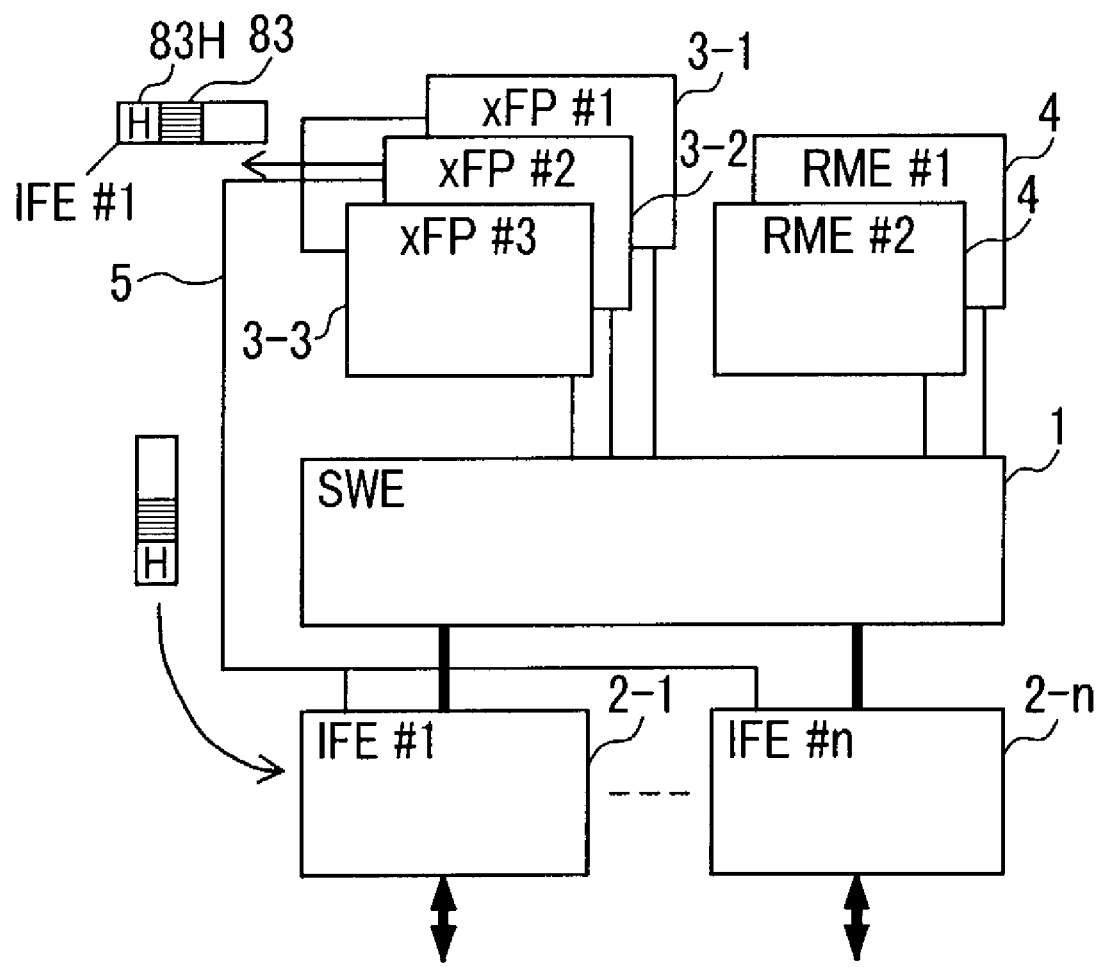
FIG. 12 is a block diagram showing the structure of the packet communication device of the present invention.

An internal header 83H, as well as packet header 83, is attached to the packet after application layer processing as shown in FIG. 12 so that the packet will be sent back to the original source IFE2 (in this example, IFE2-1).

Figure 13:
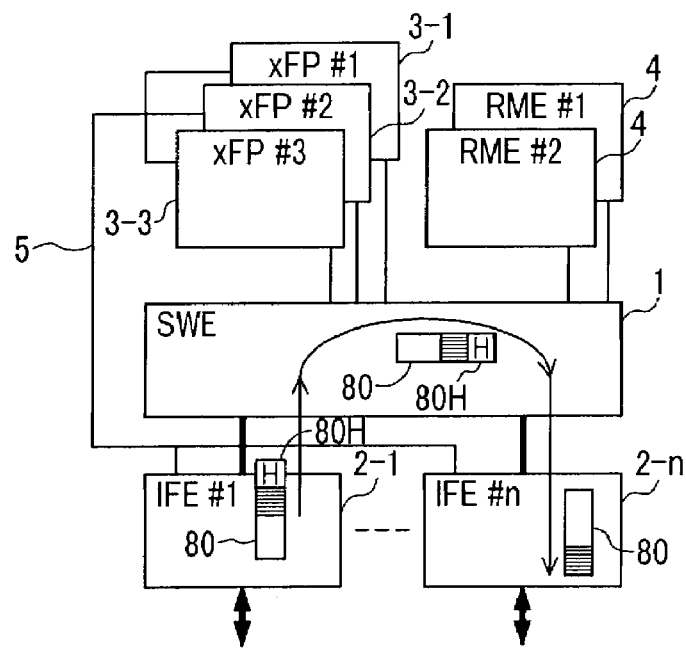
FIG. 13 is a block diagram showing the structure of the packet communication device of the present invention.

An internal header 80H, which indicates the desired output IFE, is attached to the packet 80 that arrived at the source IFE2 (in this example, IFE2-1) as shown in FIG. 13, and then, the packet is sent to the desired output IFE2 (in this example, IFE2-n) through the SWE1. Typical items for identifying the forwarding destination for upper layer processing are RTP and HTTP headers, URL, cookies, SSLID, application identifier and file extensions, etc. These are provided as different xFP modules having the different functions. Those modules are incrementally installed as needed.

The following examples describe scalability for cases where the processing performance of one special function module becomes insufficient, and an identical special function module is added incrementally.

Figure 15:
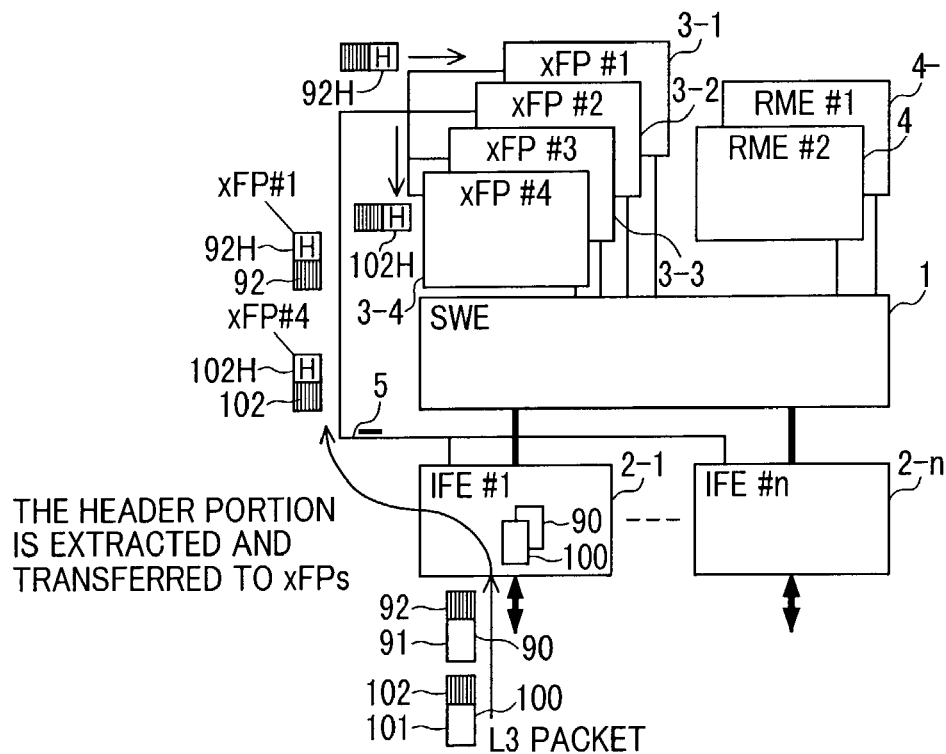
FIG. 15 is a block diagram showing a structure of the packet communication device of the present invention.

In the example in FIG. 15, to increase the processing performance of the xFP3-1, an identical special function packet processor xFP3-4 is additionally installed so that the traffic load can be balanced (dispersed) between these two xFPs. First, the respective header sections of the layer 3 packet 90 (composed of a data section 91 and a packet header section 92) and a packet 100 (composed of a data section 101 and a packet header section 102) are extracted at the ingress forwarding processor 23. Then, the internal header 92H corresponding to the xFP3-1 is attached to the packet header 92. In the same way, the device internal header 102H corresponding to the xFP3-4 is attached to the packet header 102. According to the respective internal header, the packet header 92 is processed by the xFP3-1, and the packet header 102 is processed by the xFP3-4 in a load balancing manners.

Figure 16:
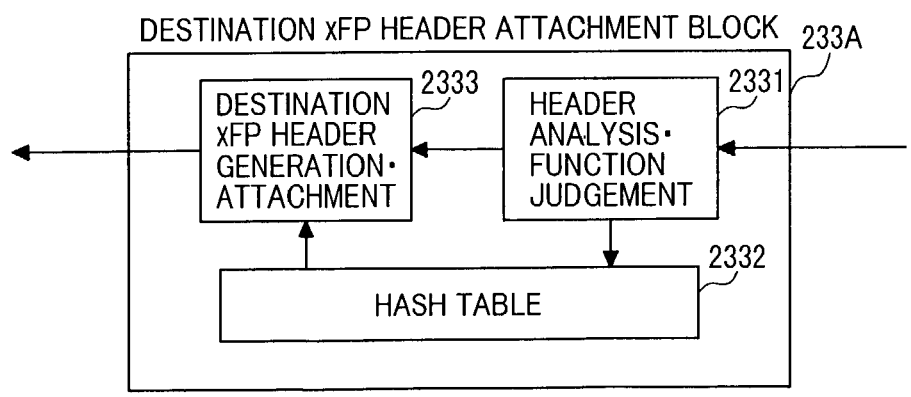
FIG. 16 is a block diagram showing another structure of the interface module of the packet communication device of the present invention.

The load balancing among the multiple xFPs (processors) is described next using three methods. The first method is described using FIG. 16. A destination xFP header attachment block 233A within the ingress forwarding processor 23 is composed of a header analysis/function judgment (block) 2331, a hash table 2332 and a destination xFP header generation/attachment (block) 2333. The function required for the IP packet, which is input to the destination xFP header attachment block 233A, is determined by the header analysis/function judgment (block) 2331. (In this example, layer 3 processing is required, which is equivalent to XFP3-1 or xFP3-4). Hash processing is then performed by the hash table 2332 using the flow information based on the source IP address (SIP) or a combination of the source IP address and destination IP address (DIP) as a key. Then packets are distributed to the corresponding xFP (In this example, xFP3-1 for the packet header 92, and xFP3-4 for the packet header 102). The destination xFP header generation/attachment (block) 2333 attaches an internal header 92H corresponding to xFP3-1 to the packet header 92; and attaches an internal header 102H corresponding to xFP3-4 to the packet header 102 based on the processing results of the hash table 2332. This method is characterized in that the same xFP processors handle the same flow, therefore, no reversal of packet sequence occurs in load balancing. However, load balancing could be inefficient if uneven traffic flow is fed to the device.

Figure 17:
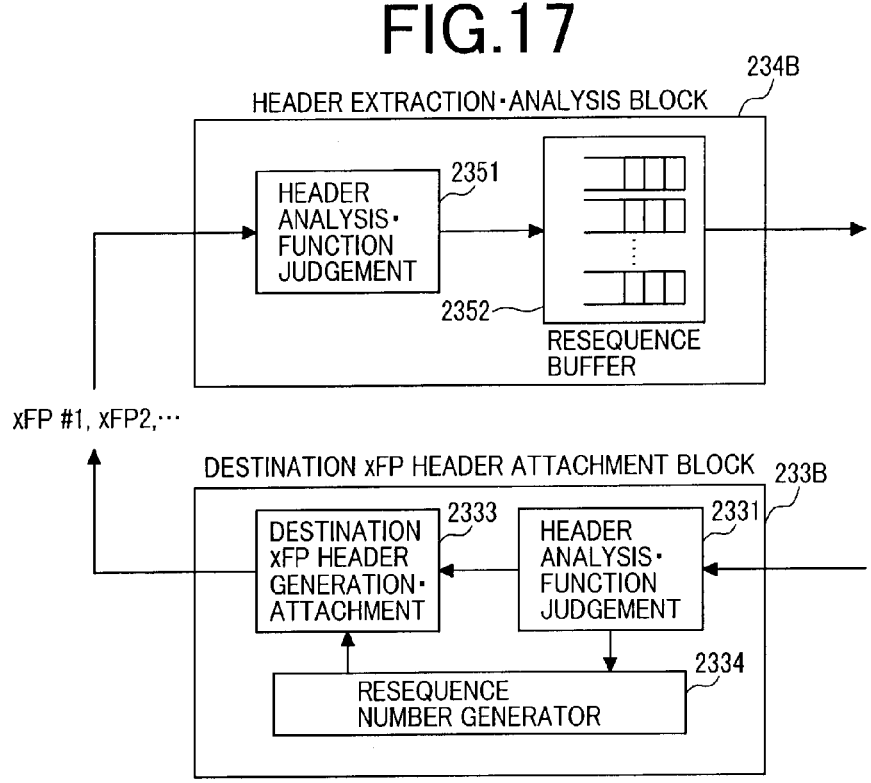
FIG. 17 is a block diagram showing another structure of the interface module of the packet communication device of the present invention.

The second method is described next using FIG. 17. A destination xFP header attachment block 233B within the ingress forwarding processor 23 is composed of a header analysis/function judgment (block) 2331, a sequence number generator 2334 and a destination xFP header generation/ attachment (block) 2333. A header extraction analysis block 234B is composed of a header analysis function judgment block 2351 and a resequence buffer 2352. The required function of input IP packet is determined by the header analysis/function judgment (block) 2331. In this example, a function for xFP3-4 or xFP3-1 equivalent to layer 3 processing is required. A sequence number is then generated for the IP packet of each flow by the sequence number generator 2334. The sequence number for each flow is administered by the sequence number generator 2334. The destination xFP header generation/attachment (block) 2333 distributes input packets cyclically among the multiple xFPs for each function. (In this example, cyclically distributed to xFP3-1 or xFP3-4.) In this method, the same xFP3 processor is not always used for the same flow. Therefore, reversal of the packet sequence may occur as a result of load balancing. To avoid this, the order of packets from xFP3 processors are resequenced in the header extraction analysis block 234B. More specifically, the function and flow of the packets are identified by the header analysis function judgment 2351. The packets are then stored in the resequence buffer 2352 based on this identification, and the sequence integrity is then recovered based on the sequence number attached by the destination xFP header attachment block 233B. The third load balancing method is described next using FIG. 18 and FIG. 19.

Figure 18:
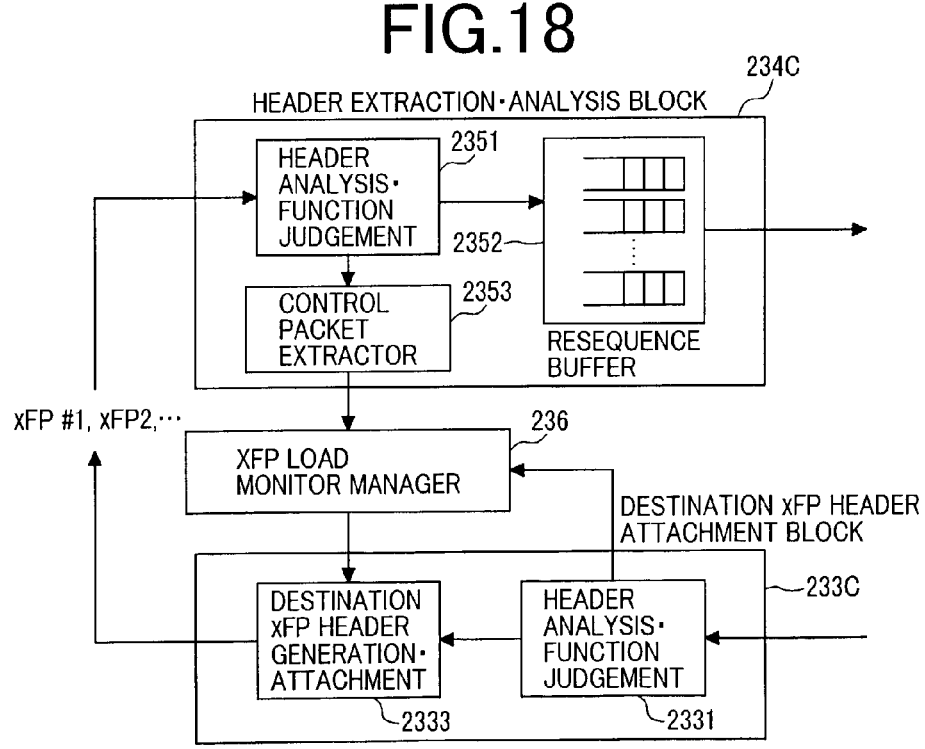
FIG. 18 is a block diagram showing another structure of the interface module of the packet communication device of the present invention.

FIG. 18 is a block diagram showing another structure of the interface module of the packet communication device of the present invention.

Figure 19:
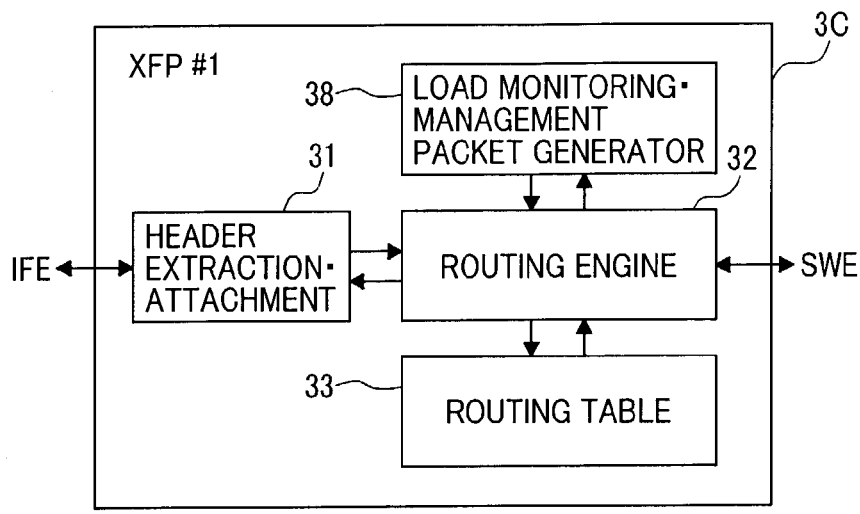
FIG. 19 is a block diagram showing the structure of another special functional packet processor (xFP) of the packet communication device of the present invention.

FIG. 19 is a block diagram showing the structure of another special functional packet processor (xFP) of the packet communication device of the present invention.

A destination xFP header attachment block 233C within the ingress forwarding processor 23 is composed of a header analysis/function judgment (block) 2331, and a destination xFP header generation/attachment (block) 2333. A header extraction analysis block 234C is composed of a header analysis function judgment 2351 block, a resequence buffer 2352, and a control packet extractor 2353. The ingress forwarding processor 23 further has an xFP load monitor-manager 236. The function required for the IP packet, which is input to the destination xFP header attachment block 233C, is determined by the header analysis/function judgment (block) 2331. When the function is determined, this is reported to the xFP load monitor-manager 236. The xFP load monitor-manager 236 monitors the load status of each xFP3. When some of the multiple xFP3 processors have the same function, the xFP load monitor-manager 236 selects the xFP3 with the lightest load and informs the status to the destination xFP header generation/attachment (block) 2333. In the destination xFP header generation/attachment (block) 2333, an internal header corresponding to the xFP3, which is indicated by the xFP load monitor-manager 236, is attached to the packet. In this method also, the same xFP3 processor is not assumed to process the same flow. Therefore, reversal of the packet sequence may occur due to load balancing. The sequence of the packet processed by the xFP3 should therefore be reconstructed in the header extraction analysis block 234B. More specifically, the applied function and flow units of each packet are identified by the header analysis function judgment 2351. The packets are then stored in the resequence buffer 2352 based on the applied function and flow units. Finally, the packet sequence is controlled based on the sequence number, which is attached by the destination xFP header attachment block 233C in ingress side.

In this method, as shown in FIG. 19, the structure further comprises a load monitoring/control packet generator 38, which monitors each xFP's load and periodically reports the load status to IFE2. When the control packet from a xFP is periodically received by each IFE, the control packet is extracted by the control packet extractor 2353, in FIG. 18, and the load status is reported to the xFP load monitor-manager 236.

Figure 20:
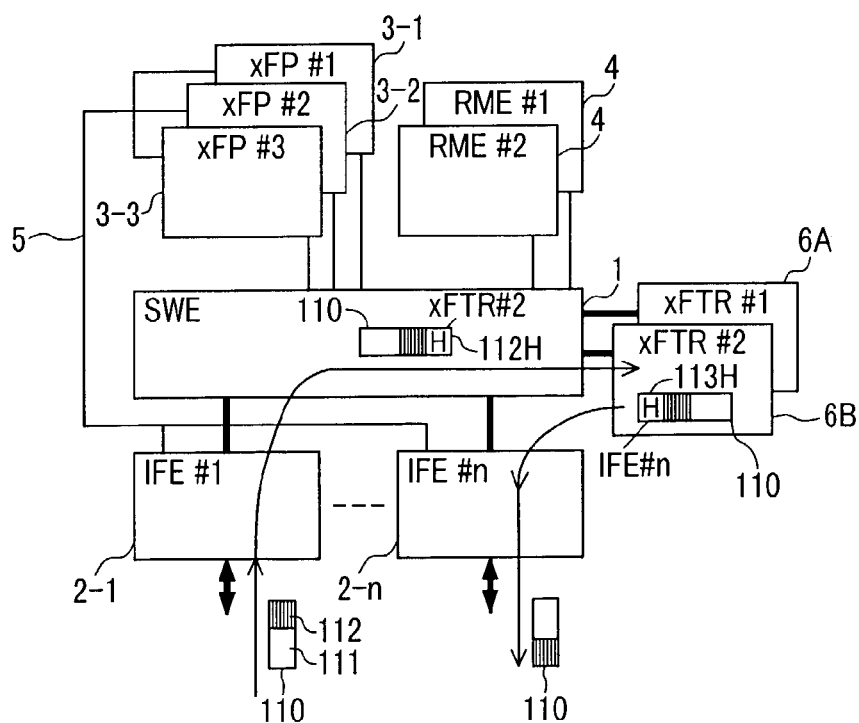
FIG. 20 is a block diagram showing a structure of the packet communication device of the present invention.

Another example of the present invention is described using FIG. 20.

Figure 30:
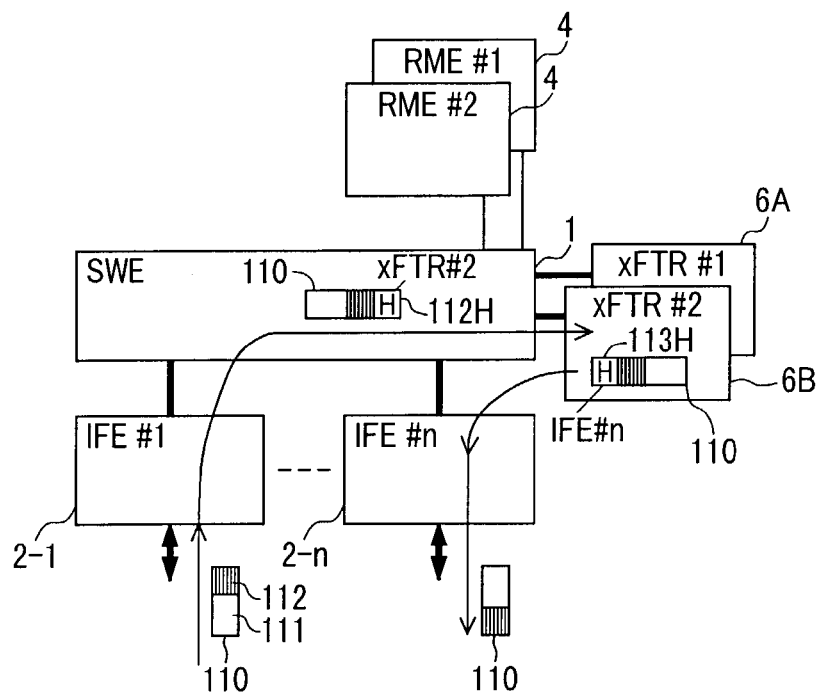
FIG. 30 is a block diagram showing a structure of the packet communication device of the present invention.
Figure 31:
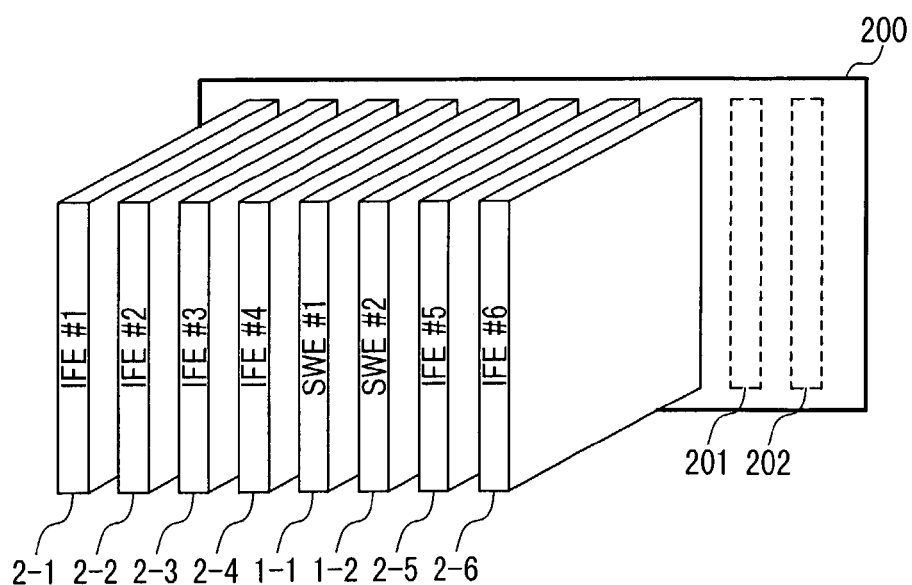
FIG. 31 is an installation example of the packet communication device of the present invention.
Figure 32:
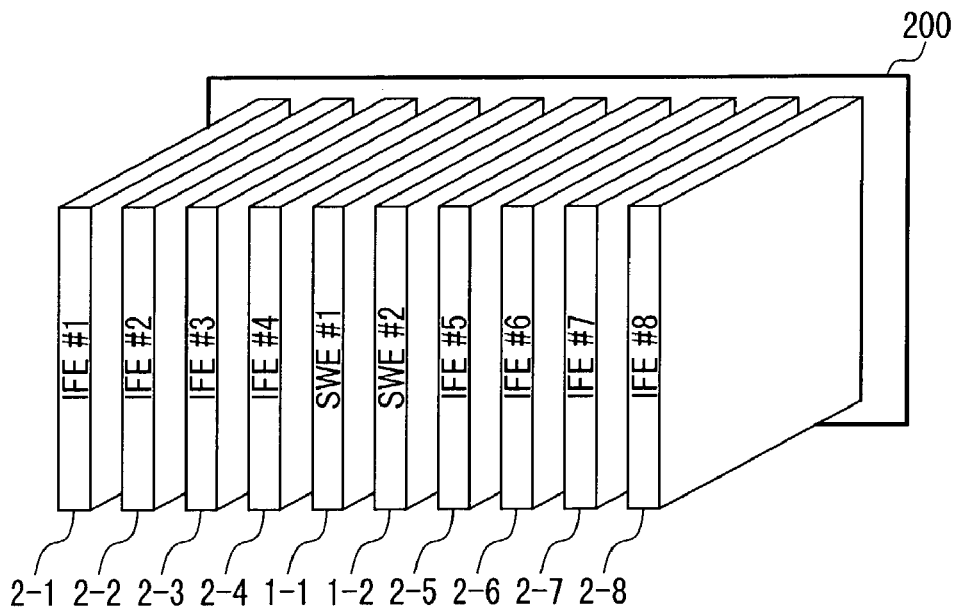
FIG. 32 is an installation example of the packet communication device of the present invention.
Figure 33:
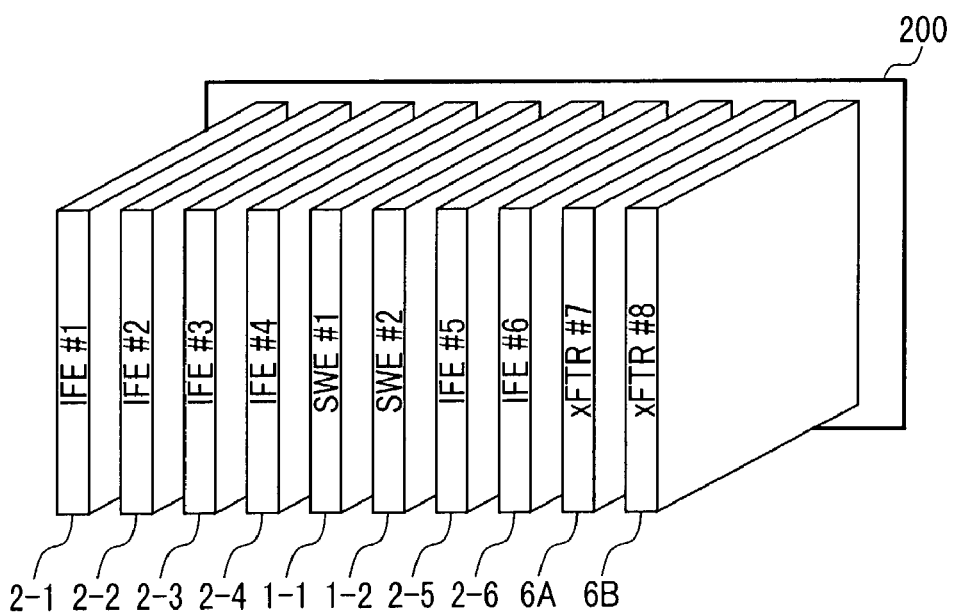
FIG. 33 is an installation example of the packet communication device of the present invention.

To perform application layer processing in the xFP3, as explained in the example of xFP3-2, the entire packet must be sent to (and received from) the xFP3. The bandwidth of the logical bus 5 therefore could be a bottleneck when a large number of packets requiring layer processing are input to the device. In other words, processing efficiency might be deteriorated. An xFTR6 (special functional packet trunk module) is therefore added as shown in FIG. 20. This xFTR6 is a module for upper layer processing, and has the same SWE1 interface as the IFF2. The bandwidth bottleneck caused by the logical bus 5 can be eliminated by connecting the xFTR6 to the IFE2 through SWE1. Multiple xFTR6 modules can also TO be added at a time for each upper layer function (In FIG. 20, the two modules xFTR6A, xFTR6B. A structure without xFP modules and with xFTR modules is possible, as shown in FIG. 30. Also as described in a previous example, scalability of processing can be attained by the load balancing using a structure containing multiple xFTR modules having the same function. A description of the IFE2 to carry out load balancing is omitted here since it is identical to the description for FIG. 16 through FIG. 19. An installation example containing the IFE2, xFTR modules is described next. The backplane 200 in FIG. 31 accomodates multiple IFE (2-1 through 2-6) and SWE (1-2, 1-2). In this example, the slot 201 and slot 202 are empty. These empty slots 201, 202 can accept IFEs (2-7, 2-8) as shown in FIG. 32 or xFTRs (6A, 6B) as shown in FIG. 33.

Figure 34:
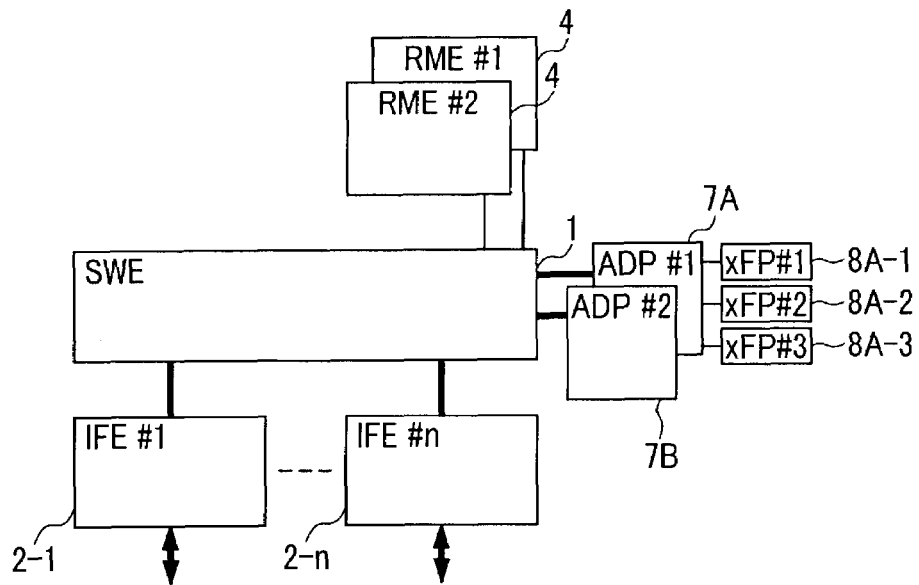
FIG. 34 is a block diagram showing a structure of the packet communication device of the present invention.
Figure 35:
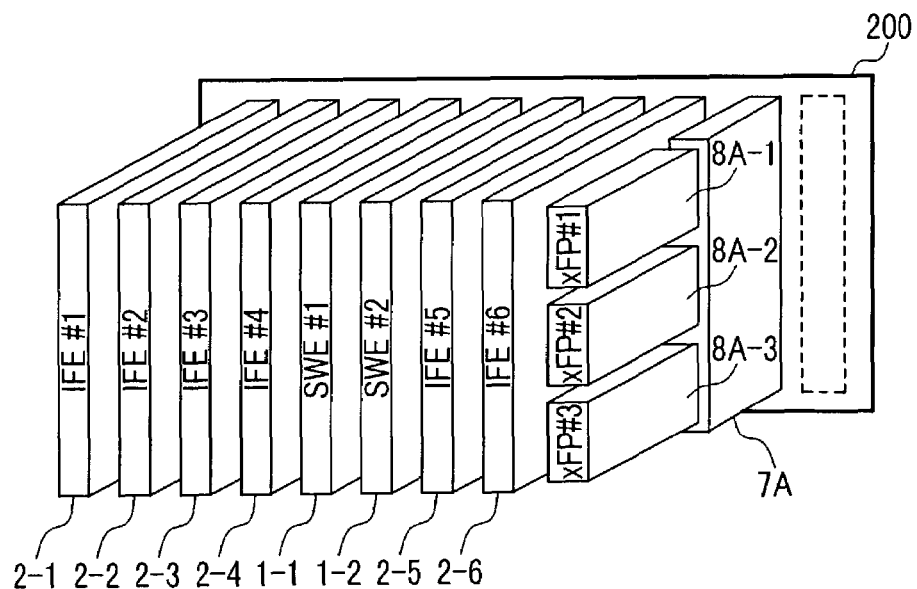
FIG. 35 is an installation example of the packet communication device of the present invention.

Another embodiment of the present invention is described using FIG. 34 and FIG. 35. In this embodiment, special functional processors are contained in the slots. A first module has the same physical interface as an IFE2. Second modules which have functional processors (IFE) are connected to the first module.

In a structure installed with xFP2 modules as shown in FIG. 34, the xFP2 modules are mounted to the IFE slot through a connecting adapter (ADP7).

Figure 21:
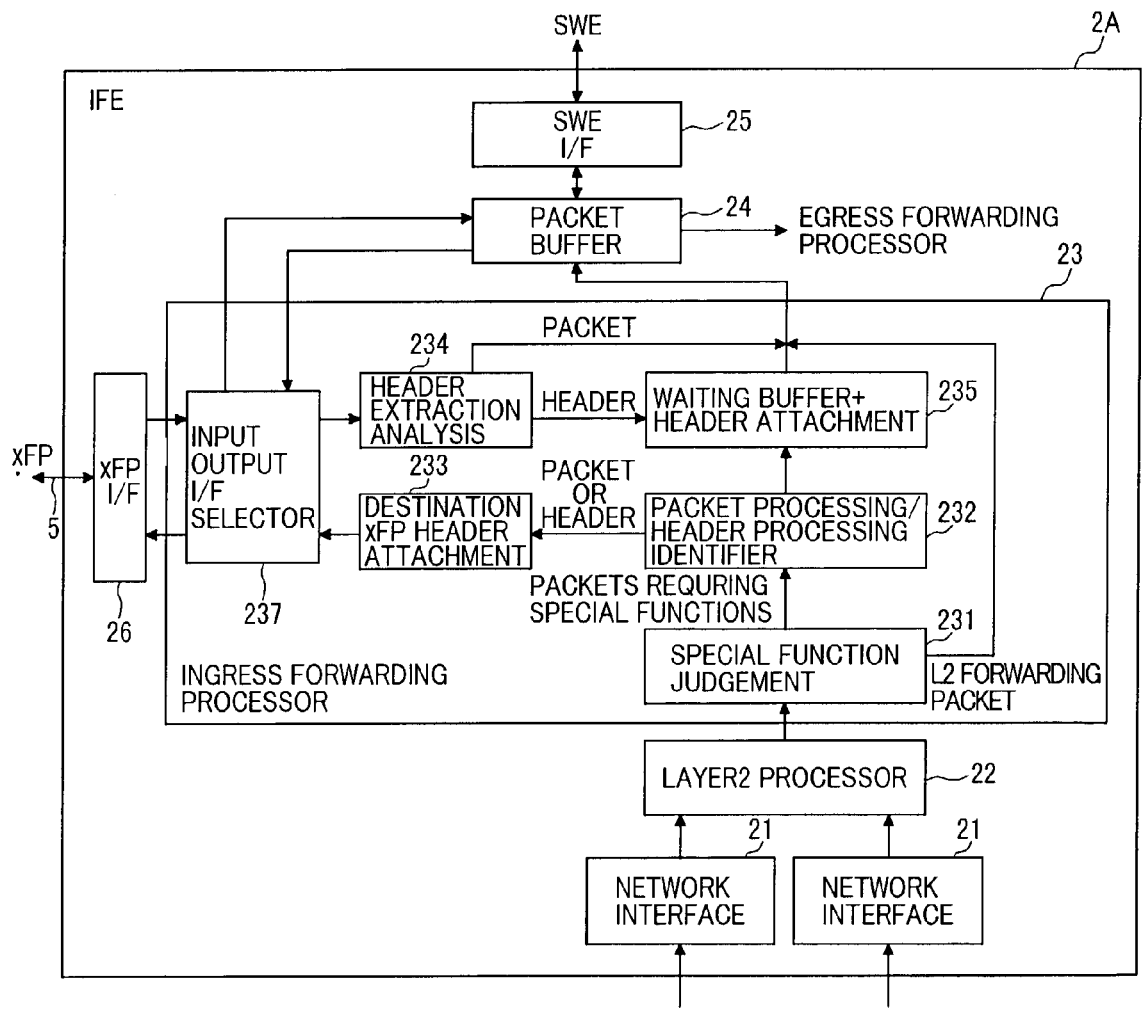
FIG. 21 is a block diagram showing another structure of the interface module of the packet communication device of the present invention.

FIG. 35 is an oblique view of the adapter. The ADP7 has the function of distributing packets received from the SWE1, to the multiple xFP modules (in this example, 8A-1 through 8A-3) based on the header. The ADD7 also has the function of multiplexing the packets received from the multiple xFPs (8A-1 through 8A-3) and sending them to the SWE1. This implementational configuration eliminates the need to prepare dedicated xFP2 slots and wiring 5. Also, the IFE slots are not occupied by a single special functional module as is the case when with xFTR modules. For example, multiple xFPs may be sequentially added to free IFE slot as needed. Another embodiment of the invention is shown using FIG. 21.

Figure 22:
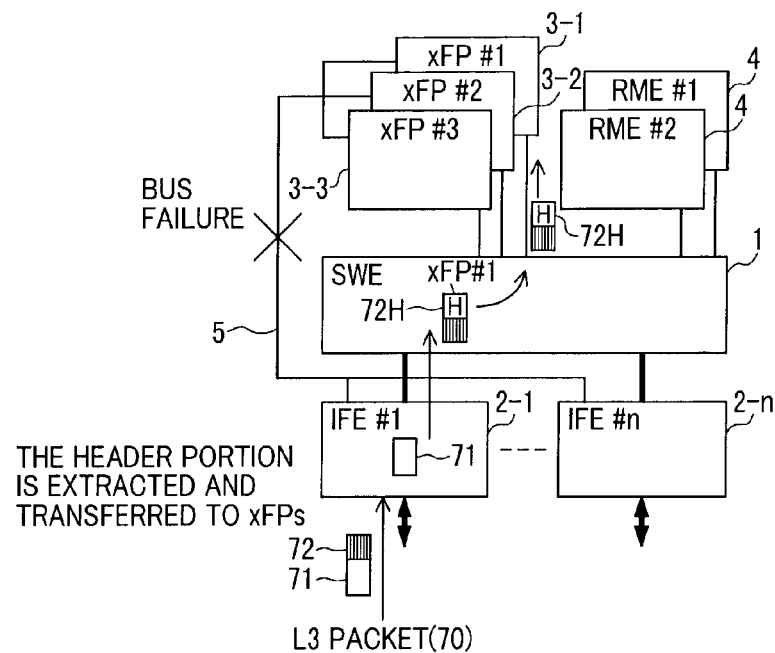
FIG. 22 is a block diagram showing a structure of the packet communication device of the present invention.

An input/output I/F selector 237 is installed in the ingress/egress forwarding processor 23 within the IFE2. A device internal header is attached to the packet header or the packet, which are exchanged (sent and received) with xFP3 modules through the logical bus 5. The format of the internal header is identical to that of the internal header, which is applied to the packets exchanged (sent and received) with SWE1. If a failure occurs in the logical bus 5 as shown in FIG. 22, the input/output I/F selector 237 sends the packet or the packet header needing special function processing through the SWE25 instead of sending the packet via the logical bus 5. In FIG. 22 shows the example of sending the packet header 72 of packet 70 as in FIG. 8 to xFP3-1 through SWE1 instead of the logical bus 5. The xFP3 also sends the packets or packet headers back to the original IFE2 through the SWE1 instead of the logical bus 5 after special function processing. Therefore, by making the data transfer format of SWE1 identical to the data transfer format of the logical bus 5, a spare path can be prepared through SWE1, when failures occur on the logical bus 5. A system with high reliability and a low cost can in this way be achieved without having to prepare redundant logical paths 5.

Figure 24:
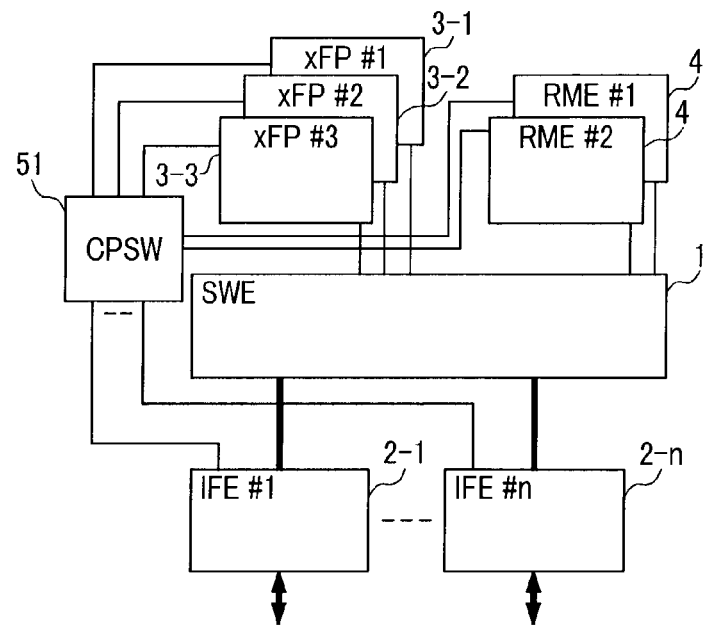
FIG. 24 is a block diagram showing a structure of the packet communication device of the present invention.

Another embodiment of the present invention is described next using FIG. 24 and FIG. 25.

In the previous description, the IFE2 and xFP3 were connected by the logical bus 5 for communication. However, the present connection configuration may utilize a CPSW (Control Path Switch) 51 as shown in FIG. 24. By utilizing a structure having the CPSW 51, point-to-point connections can be made between the IFE2 and xFP3 and this enables higher speed communication.

Figure 25:
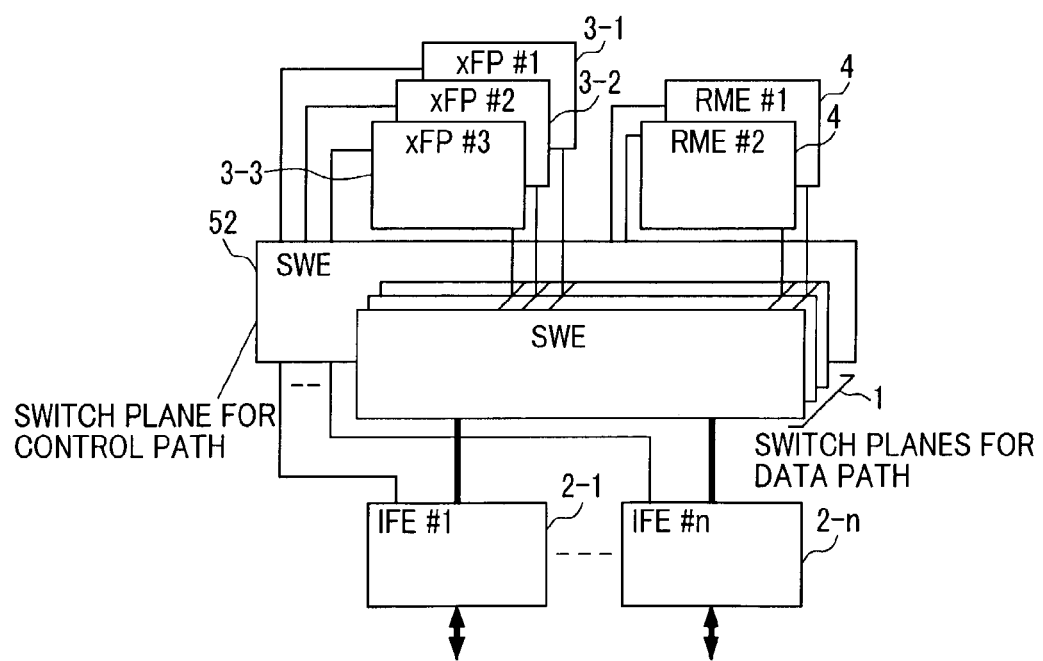
FIG. 25 is a block diagram showing a structure of the packet communication device of the present invention.

A block diagram showing a structure of the packet communication device of the present invention is shown in FIG. 25. When using a configuration with a switch using multiple SWE1 a shown in FIG. 25, one SWE1 may be allotted for the control path, and utilized as the control path switch plane (SWE52). This has the advantage that SWE1 can also be used as the control path, which is physically identical.

Still another embodiment of the present invention is described using FIG. 26 through FIG. 29.

In the previous examples, special function processing of packets is done with the xFP3 as the special functional packet processor. However, a packet communications device with special functional packet processing can also be provided by consolidating this function to the switch section.

Figure 26:
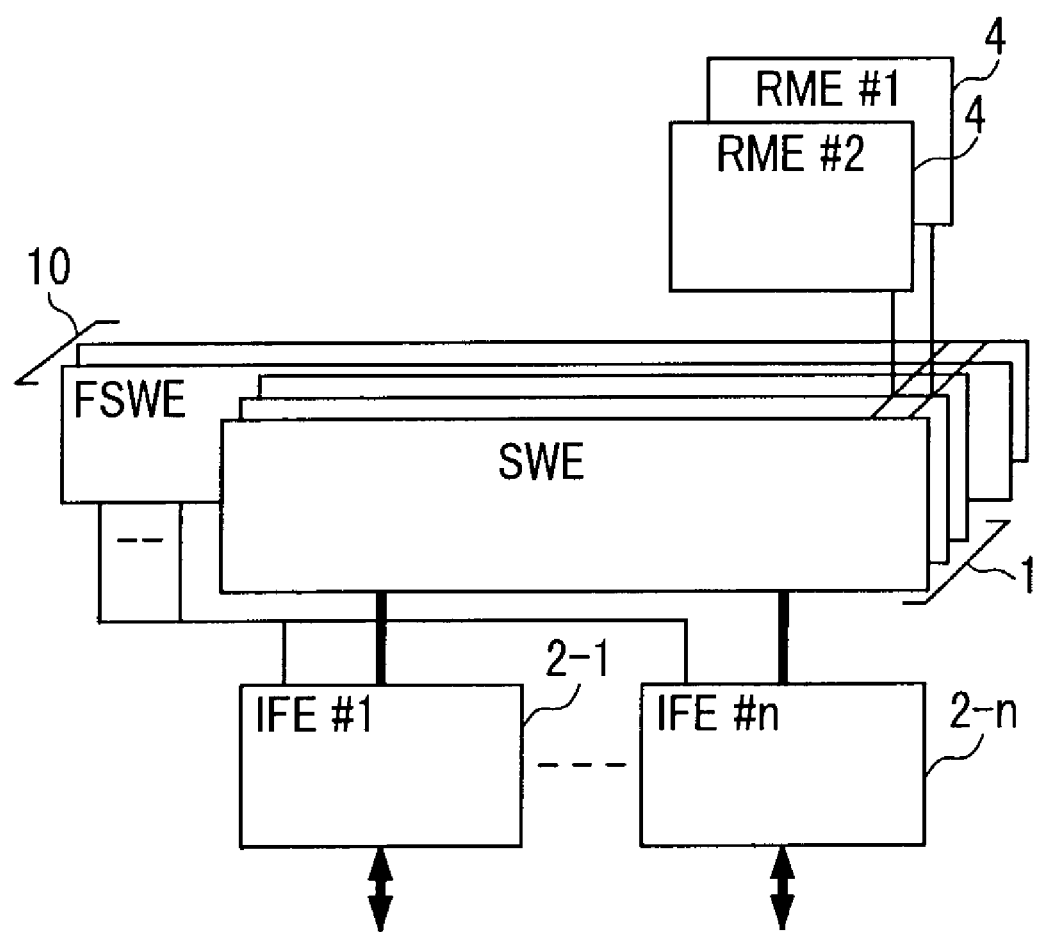
FIG. 26 is a block diagram showing a structure of the packet communication device of the present invention.

In the packet communications device shown in FIG. 26, multiple FSWE (Functional Switch Element) 10 can be added to the multiple SWE1s. Basic layer 2 packets are to be forwarded to the bufferless SWE1, and packets requiring special functional processing are to be forwarded to the FSWE 10. The special functional packet processor with this configuration has a crossbar switch 10 connecting to multiple line interfaces 2-1. The crossbar switch 10 with the special functional packet processor and the ordinary crossbar switch 1 are both connectable to a common slot. The crossbar switch 10 with the special functional packet processor and the ordinary crossbar switch 1 have separate connecting paths from the line interface.

Figure 27:
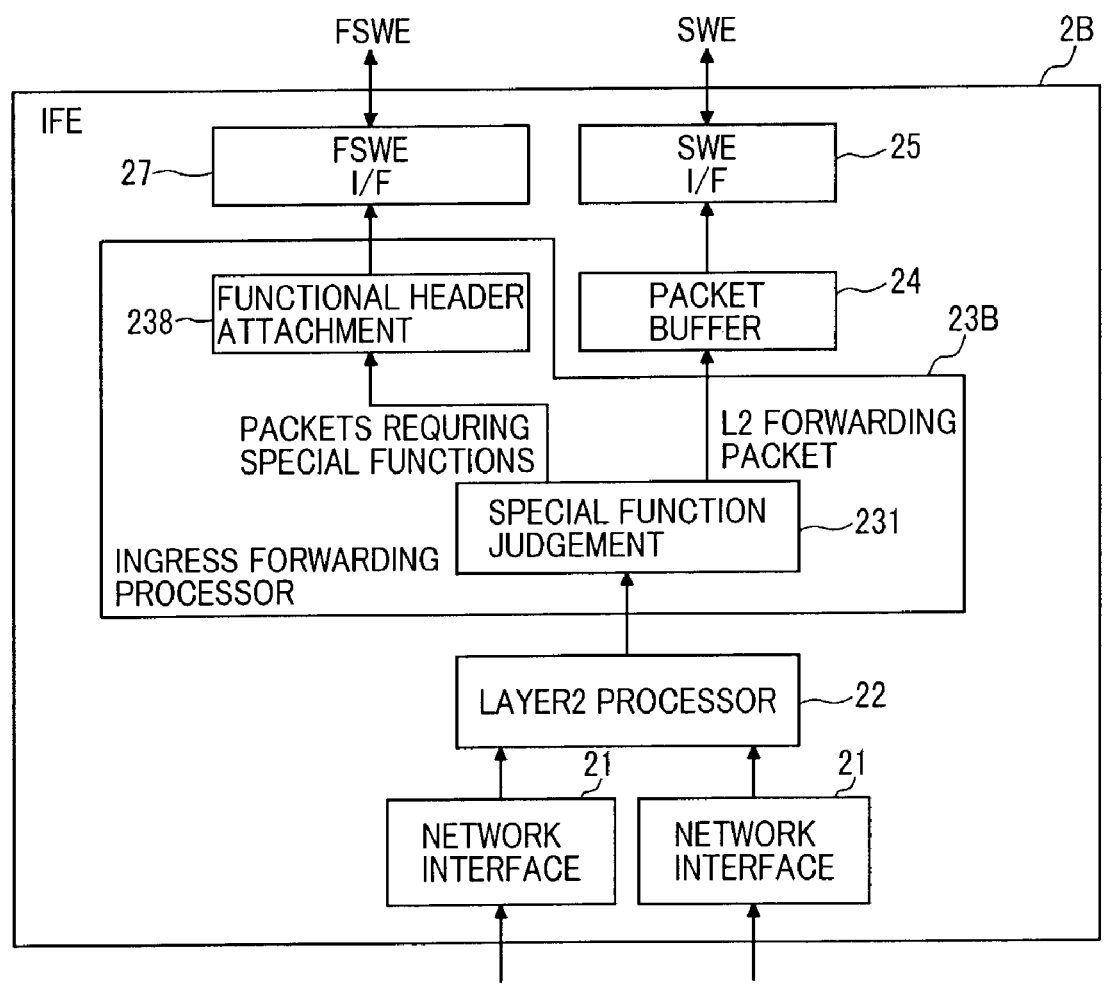
FIG. 27 is a block diagram showing another structure of the interface module of the packet communication device of the present invention.

The input function block for interface element IFE2B of this embodiment is described using FIG. 27. The input side of the IFE2B is composed of a network interface 21, a layer 2 processor 22, an ingress forwarding processor 23B, a packet buffer 24, an SWE I/F 25 and an FSWE I/F 27. First, the frames input to the device undergo physical layer processing by the network interface 21. In case of an Ethernet interface, MAC (Media Access Control) layer processing is performed. The functional judgment is next performed by the layer 2 processor 22 utilizing the destination address within the frame, the transmit source address, VID (VLAN ID), FDB (Forwarding Data Base) etc. The destination output port of the destination MAC address is identified by this functional judgment process. The ingress forwarding processor 23 then judges whether or not to perform special function processing on the input frame (called a packet in layer 3). This ingress forwarding processor 23 is composed of a special functional judgment block 231 and a functional header attachment 238.

The header of the input packet is first identified by the special functional judgment block 231 and a decision is made as to whether or not special functional processing is required. Packets (frame) not requiring special functional processing are sent to the packet buffer 24, bypassing the subsequent processing. Packets input to the packet buffer 24 are queued. Then, packets are output to the SWE1 through the SWEI/F25 after undergoing competitive output control with other IFE2. Packets, which require special functional processing, are attached with a header corresponding to destination FSWE10 These are then output to the FSWE through the FSWEI/F27 without going through the packet buffer 24. The line interface therefore has a distributing function to determine whether or not to send input packets to the crossbar switches. The IFE2B also has a FSWE I/F and a SWE I/F in order to send packets to any of the switches.

Figure 28:
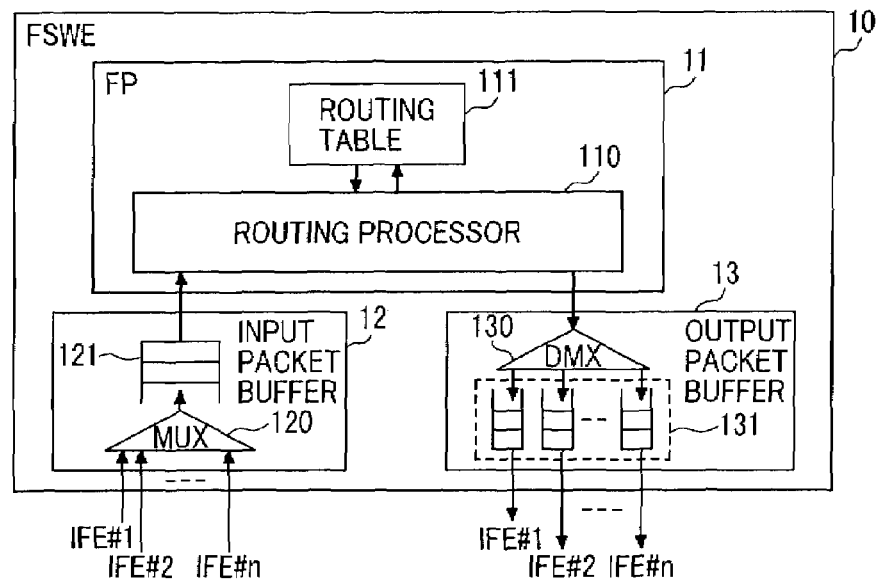
FIG. 28 is a block diagram showing the structure of the switch module of the packet communication device of the present invention.

The structure of the FSWE 10 is described next using FIG. 28. The FSWE 10 is composed of an FP11 as the functional processor, an input packet buffer 12 and an output packet buffer 13. The packet sent from the IFE2 is input to the input packet buffer 12. Packets input to the input packet buffer 12 are multiplexed at the multiplexer 120 and queued into the FIFO buffer 121. The packets queued at the FIFO buffer are read and input to FP11. The headers of the packets are extracted by the routing processor 110. Next, processing such as destination port search, filtering, and QoS (Quality of Service) are performed. The processing information for each IP address are stored in the routing table 111. The device internal header containing the destination port information is attached to the packet based on information acquired from the routing table 111. The packet is then input to the output packet buffer 13. The packet input to the output packet buffer 13 is output to the desired IFE2 after being stored in the FIFO buffer 131 of each output IFE2 based on the device internal header information attached at the routing processor 110. The embodiment in FIG. 28 shows an example of processing for a layer 3 packet. The FSWE10 is provided as a special functional packet module for the upper layer processing functions as described in FIG. 14.

Figure 29:
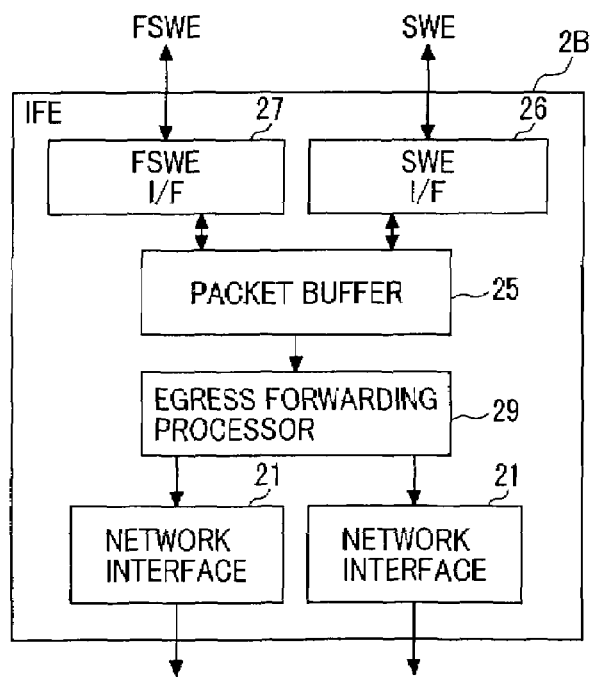
FIG. 29 is a block diagram showing another structure of the interface module of the packet communication device of the present invention.

The egress side function block for interface element IFE2B of the present structure is described next in FIG. 29. The output side function block of IFE2B is composed of an SWE I/F25, an FSWE I/F26, a packet buffer 27, an egress forwarding processor 29 and a network interface 21. The packets forwarded from the SWE1 are input to the packet buffer 27 through the FSWE I/F27. The packets forwarded from the FSWE10 are input to the buffer 25 through the FSWEI/F27. The SWE 1 uses cell forwarding. In other words, when multiple fixed-length packet formats are being used, the packet is reconstructed into the original variable-length packet by the packet buffer 27. Priority output control is in some cases also performed at the packet buffer 27 according to the quality class. The headers of the packets (when layer 3 packets), which are output from the packet buffer 27, are rewritten for their next forwarding destination by the egress forwarding processor 28. More specifically, the destination MAC address is rewritten to a MAC address called a Next Hop for the router (switch) on the next path to the destination. The packet is then output from the output line to the next address through the network interface 21.

Figure 36:
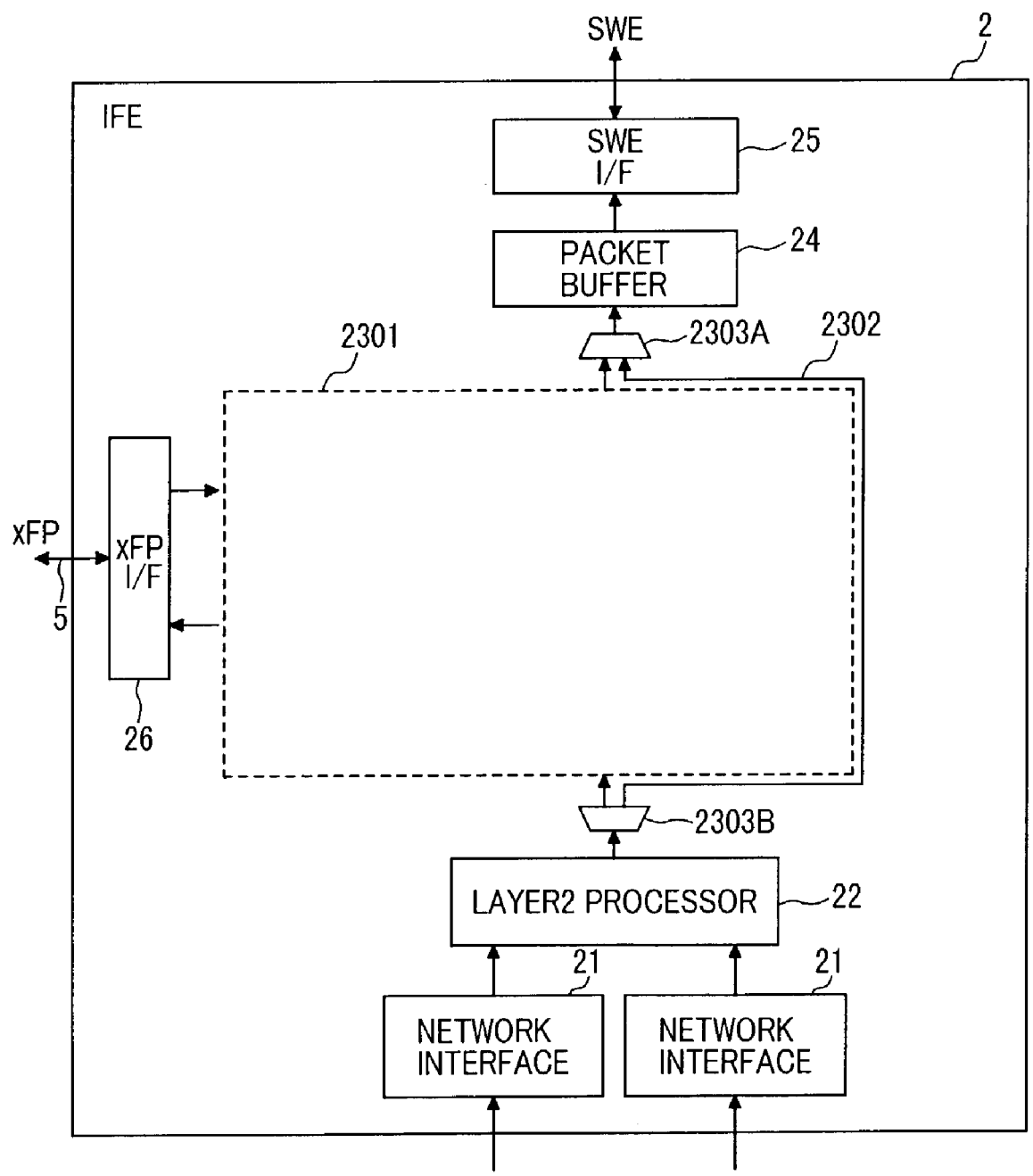
FIG. 36 is a block diagram showing another structure of the interface module of the packet communication device of the present invention.

Finally, FIG. 36 shows a structure capable of containing a selectable special functional processor for the previously described IFE2. This structure is composed of a socket section 2301 allowing addition of ingress forwarding processors 23, and two selectors 2303A and 2303B. If not loaded with the ingress forwarding processors 23, both of the selectors 2303A and 2303B are switched to bypass the socket section 2301 and use the line 2302. However if loaded with ingress forwarding processors 23, both of the selectors 2303A and 2303B are switched to use an ingress forwarding processor 23. A low cost IFE modules can be provided without the ingress forwarding processors 23, if only basic layer 2 forwarding is required.

As explained above, the embodiments provide a packet communications device which is capable of adding functions flexibly. More specifically, the present invention provides a packet communication device, starting with a base model for simple layer 2 forwarding function and functional upgradability. This means that when functions such as upper layer processing and special function services are required, these functions can be easily added as special functional modules or as special functional switch modules.

What is claimed is:

1. A packet communication device comprising:
a plurality of line interfaces for receiving input packets,
a routing manager for deciding the transfer path of said input packets;
a crossbar switch connected with a plurality of said line interfaces through a first connecting path;
a special functional processor connected with a plurality of said line interfaces through a second connecting path; and
a special function judgment block for deciding whether or not said input packet requires special function processing, said special function judgment block being attached to each of said line interfaces,
wherein packets decided by said special function judgment block not to require special processing are sent directly to said crossbar switch through said first connecting path; and packets decided to require special processing are sent to said special functional processor through said second connecting path and processed therein, and then are sent back to respective line interfaces where the packets sent from and forwarded therethrough to said crossbar switch.

2. A packet communication device according to claim 1, wherein each of a plurality of said line interfaces comprises a layer 2 processing function, and said special functional processor possesses an upper layer processing function.

3. A packet communication device according to claim 1, wherein said special functional processor can be installed according to the required functions.

4. A packet communication device according to claim 1, wherein said special functional processor comprises a first special functional packet processor and a second special functional packet processor.

5. A packet communication device according to claim 1, wherein said first connecting path and said second connecting path have identical data formats, and when a failure occurs on said second connecting path, said line interfaces and said special functional processor is interconnected by either said first connecting path or said crossbar switch, and said line interface comprises a selection circuit for selectively sending and receiving data along either of said first and said second connecting paths.

6. A packet communication device according to claim 1, wherein said special functional processor is composed of a plurality of special functional processors having identical functions.

7. A packet communication device according to claim 1, wherein said special function processor is composed of a second crossbar switch connected with said interfaces through said second connecting path,
either said second crossbar switch or said crossbar switch is connected to a common slot, and
said line interface has a function for distributing said input packets to at least one of said second crossbar switch and said crossbar switch.

8. A packet communication device according to claim 1, wherein said special function processor is made as a module that is either attached to or removed from the slot as required.

9. A packet communication device according to claim 8, wherein said special function processor comprises a first module having its own slot and connected to a slot, and a second module connected to said slot of said first module.

10. A packet communication device comprising:
a plurality of line interfaces;
a crossbar switch connected to a plurality of said line interfaces through a first connecting path;
a plurality of slots for connecting special functional units connected with a plurality of said line interfaces through a second connecting path, wherein
each of said line interfaces comprises a layer 2 processing function and a special function judgment function for deciding whether or not said input packet requires special processing, and
when said special function judgment function decides that a packet does not require special function processing, said packet is forwarded directly to said crossbar switch through said first connecting path; and when a packet is decided to require special function processing, said packet is sent to said special functional unit corresponding to said required special function through said second connecting path, next, performed upper layer processing, and then sent back to respective line interfaces where the packets sent from and finally forwarded to said crossbar switch.

11. A packet communication device according to claim 10, wherein a plurality of said slots have the same shape, and multiple types of special functional units of different functions can be connected to said slots.

12. A packet communication device according to claim 11, comprising a load balancer for distributing the load to a plurality of said special functional units when a plurality of said special functional units with identical functions are connected to a plurality of said slots.

13. A packet communication device according to claim 12, wherein said load balancer comprises:
a header analysis function judgment block for deciding the type of processing required by said input packets;
a hash table for hash processing using the flow information based on the destination IP address and source IP address of said input packets as a key; and
a destination header generator/attacher for distributing said input packets to specified said special functional units based on results of said judgment and results of said hash processing.

14. A packet communication device according to claim 12, wherein said load balancer comprises:
a header analysis function judgment block for deciding the type of process required by said input packets;

a sequence number generator for generating sequence numbers for the IP packets in each flow and also monitoring said sequence numbers in each flow; and a destination header generator/attacher for cyclically distributing said input packets to multiple said special functional units according to each function, said packet communication device further comprising a header extraction/analyzer for reconstructing the packet sequence of said input packets processed by said special functional units.

15. A packet communication device according to claim 12, wherein said load balancer comprises:

a header analysis function judgment block for deciding the type of process required by said input packets;

a load monitor-manager for monitoring the load status of each said special functional units, and selecting the lightest load or said special functional unit with a load lower than a specified value, when notified by said header analysis function judgment block that processing of said input packets is required and said special functional units for performing said processing have been installed; and a destination header generator/attacher for attaching said device internal headers matching said special functional unit selected by said load monitor-manager to said packet.

16. A packet communication device comprising:

a plurality of line interfaces, a crossbar switch connected with said line interfaces through a first connecting path, a plurality of special functional processors connected with said line interfaces through a second connecting path, wherein each of said line interfaces comprise a special function judgment function for deciding whether or not said input packet requires special processing, and when said special function judgment function decides that a packet does not require special function processing, said packet is forwarded directly to said crossbar switch through said first connecting path; and when said packet is decided to require special function processing, said packet is forwarded to any one of said special functional units through said second connecting path with the corresponding special function and upper layer processing performed, and said packet is then sent back to respective line interfaces where the packets sent from and forwarded to said crossbar switch.

17. A packet switch comprising:

a plurality of line interfaces, a crossbar switch connected with said line interfaces through a first connecting path, a plurality of special functional processors connected with said line interfaces through a second connecting path, wherein each of said line interfaces comprise a special function judgment function and a packet waiting buffer for deciding whether or not said input packet requires special processing, and when said special function judgment function decides that said input packet does not require special function processing, said input packet is forwarded directly to said crossbar switch through said first connecting path; and when said input packet is decided to require special function processing, a packet header of said input packet is forwarded to any one of said special functional units through said second connecting path with the corresponding special function, and packet data of said input packet decided to require special function processing is stored in said packet waiting buffer, and after said packet header whose upper layer processing was completed by said special functional processor is sent back to respective line interfaces where the packets sent from, said header is then combined with said packet data stored in said packet waiting buffer, and forwarded to said crossbar switch.

* * * * *